US011927894B2

(12) United States Patent
Kume et al.

(10) Patent No.: US 11,927,894 B2
(45) Date of Patent: Mar. 12, 2024

(54) IMAGE FORMING APPARATUS CONTROLLING CONTACT AND SEPARATION OF DEVELOPING AND IMAGE BEARING MEMBERS

(71) Applicant: CANON KABUSHIKI KAISHA, Tokyo (JP)

(72) Inventors: Takao Kume, Kanagawa (JP); Satoshi Nishida, Kanagawa (JP); Isamu Takeda, Tokyo (JP); Takanori Mitani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/860,474

(22) Filed: Jul. 8, 2022

(65) Prior Publication Data

US 2023/0011077 A1 Jan. 12, 2023

(30) Foreign Application Priority Data

Jul. 9, 2021 (JP) ................................ 2021-114657

(51) Int. Cl.
*G03G 15/08* (2006.01)

(52) U.S. Cl.
CPC ................................ *G03G 15/0865* (2013.01)

(58) Field of Classification Search
CPC ....................... G03G 15/0813; G03G 15/0865
USPC ......................................... 399/265, 302, 308
See application file for complete search history.

(56) References Cited

U.S. PATENT DOCUMENTS 10,042,300 B2 * 8/2018 Endoh ................ G03G 15/0813
11,209,743 B2 12/2021 Tsukahara

FOREIGN PATENT DOCUMENTS

JP 2006-292868 A 10/2006
JP 2006-349763 A 12/2006
JP 2014-115340 A 6/2014
JP 2015-206942 A 11/2015
JP 2021-086046 A 6/2021

* cited by examiner

*Primary Examiner* — Hoan H Tran
(74) *Attorney, Agent, or Firm* — Venable LLP

(57) ABSTRACT

An image forming apparatus includes first and second image bearing members and first and second developing members. The controller controls to execute first and second controls based on image information in a case that the first developing member is separated from the first image bearing member when an operation in which the image is sequentially transferred to a transferred member from the first and second image bearing members is terminated. The first developing member is started to separate from the first image bearing member in the first control after an end of an image forming area on the first image bearing member in a moving direction passes through the first transfer position, and in the second control after the end of the image forming area on the first image bearing member in the moving direction passes through the developing position and before the end of the image forming area reaches the first transfer position.

23 Claims, 13 Drawing Sheets

(a)

(b)

IMAGE FORMING APPARATUS CONTROLLING CONTACT AND SEPARATION OF DEVELOPING AND IMAGE BEARING MEMBERS

FIELD OF THE INVENTION AND RELATED ART

The present invention relates to an image forming apparatus such as a printer, copier, facsimile machine (FAX), etc., using the electrophotographic or electrostatic recording method.

Conventional image forming apparatuses using the electrophotographic method, etc., use the inline method where an image forming apparatus has a plurality of image forming portions S each equipped with an image bearing member, and the toner image formed on the image bearing member of each image forming portion is sequentially transferred to the recording material carried by the intermediary transfer member or the recording material bearing member. In an image forming apparatus of the intermediary transfer method, the toner image that is primarily transferred from an image bearing member to an intermediary transfer member in the primary transfer portion of each image forming portion is secondarily transferred from the intermediary transfer member to the recording material in the secondary transfer portion. Below is an example of an image forming apparatus that mainly uses the intermediary transfer method.

As a developing method for developing electrostatic latent images on an image bearing member in an image forming apparatus as described above, a contact developing method is known in which the developing member is in contact with the surface of the image bearing member.

In the contact developing method, the developing member and the image bearing member are driven by rotation while the developing member and the image bearing member are in contact with each other, so the friction between the developing member and the image bearing member causes the image bearing member and the developing member to wear. Therefore, if the image bearing member and the developing member continue to be in contact with each other more than necessary, the life span of the image bearing member and the developing member will be reached earlier due to deterioration of the image bearing member and the developing member.

Therefore, it is proposed that the developing member of each image forming portion is sequentially brought into contact with the image bearing member when image forming is started, and the developing member of each image forming portion is sequentially separated from the image bearing member when image forming is terminated (Japanese Laid-Open Patent Application No. 2006-292868, Japanese Laid-Open Patent Application No. 2015-206942).

On the other hand, in recent years, for the purpose of downsizing and cost reduction of image forming apparatuses, a configuration in which the motors driving the image bearing members and developing members are common has been adopted. In particular, in an in-line method image forming apparatus with multiple image forming portions S as described above, a common configuration of motors driving the image bearing members and developing members of multiple image forming portions S has been adopted. Furthermore, in addition to the image bearing members and developing members of the multiple image forming portions S, the motors that drive the intermediary transfer members may also be common.

In an image forming apparatus with such a configuration, the load fluctuation of the motor caused by separating the developing member from the image bearing member and the temporary fluctuation of the rotation speed of the image bearing member may cause image blurring or other problems with the image during image formation. Here, the image being formed above is typically the image undergoing primary transfer at the image forming portion where the developing member is separated, but images under development or primary transfer at other image forming portions S (more downstream image forming portions S) or images under secondary transfer may also be affected by the above load fluctuations. Therefore, in an image forming apparatus with this configuration, the timing for separating the developing member from the image bearing member is after the trailing end in the moving direction of the image forming area has passed through the primary transfer portion, for example, after the primary transfer portions of all (downstream) image forming portions S have been passed. The developing member may be separated from the image bearing member after the trailing end in the moving direction of the image forming area passes through the secondary transfer portion so that it does not overlap with the secondary transfer. The timing for bringing the developing member into contact with the image bearing member is just before the pre-portion of the image forming area in the moving direction reaches the developing position, for example.

However, in the method described above, the developing member is separated from the image bearing member after the trailing end in the moving direction of the image forming area passes the primary transfer portion, regardless of the presence or absence of an image, in order to suppress the effect of motor load fluctuation. This may accelerate wearing and deterioration of the image bearing members and developing members. For example, consider a case where printing is performed only on the pre-portion of a long recording material in the feeding direction, such as a legal-size document. In the method described above, even in such a case, the developing member and the image bearing member remain in contact with each other until the trailing end in the moving direction of the image forming area passes through the primary transfer portion. This may accelerate wearing and deterioration of the image bearing members and developing members.

SUMMARY OF THE INVENTION

Therefore, the present invention aims to reduce the time that the image bearing member is in contact with the developing member while suppressing the occurrence of image blurring and other defects.

The above-mentioned objective is achieved with the image forming apparatus of the present invention. In summary, a typical configuration of the present invention is an image forming apparatus comprising a first image forming portion provided with a first rotatable image bearing member on which an electrostatic latent image corresponding to image information is formed, and a first developing member contacting the first image bearing member at a developing position and configured to develop the electrostatic latent image on the first image bearing member with a first developer; a second image forming portion provided with a second rotatable image bearing member on which an electrostatic latent image corresponding to image information is formed, and a second developing member contacting the second image bearing member and configured to develop the electrostatic latent image on the second image bearing member with a second developer; a common driving source configured to drive the first image bearing member, the first developing member, the second image bearing member, and the second developing member; a transfer device configured to transfer an image formed with the first developer from the first image bearing member to a transferred member at a first transfer position, and transfer an image formed with the second developer from the second image bearing member to the transferred member at a second transfer position downstream of the first transfer position with respect to a moving direction of the transferred member; a contact-and-separation mechanism configured to cause the first developing member to contact or separate from the first image bearing member; and a controller configured to control the contact-and-separation mechanism, wherein in a case that the first developing member is separated from the first image bearing member when an operation in which the image is sequentially transferred to the transferred member from the first image bearing member and the second image bearing member is terminated, the controller controls based on the image information to switch and execute a first control in which the first developing member is started to separate from the first image bearing member after a trailing end of an image forming area on the first image bearing member with respect to a moving direction of a surface of the first image bearing member passes through the first transfer position, and a second control in which the first developing member is started to separate from the first image bearing member after the trailing end of the image forming area on the first image bearing member with respect to the moving direction of the surface of the first image bearing member passes through the developing position and before the trailing end of the image forming area reaches the first transfer position.

Another typical configuration of the present invention is an image forming apparatus comprising a first image forming portion provided with a rotatable image bearing member on which an electrostatic latent image corresponding to image information is formed, and a developing member contacting the image bearing member at a developing position and configured to develop the electrostatic latent image on the image bearing member with a developer; an intermediary transfer member onto which an image formed with the developer is transferred from the image bearing member at a primary transfer position; a transfer device configured to transfer the image formed with the developer from the intermediary transfer member to a recording material at a secondary transfer position; a common driving source configured to drive the image bearing member, the developing member, and the intermediary transfer member; a contact-and-separation mechanism configured to cause the developing member to contact or separate from the image bearing member; and a controller configured to control the contact-and-separation mechanism, wherein in a case that the developing member is separated from the image bearing member when an operation in which the image is sequentially transferred to a plurality of image forming areas on the intermediary transfer member with respect to a moving direction of a surface of the intermediary transfer member from the image bearing member is terminated, the controller controls, based on the image information of the image transferred to an image forming area passing through the secondary transfer position and preceding to a last image forming area in the plurality of the image forming areas when development of the image to the last image forming area is terminated, to switch and execute a first control in which the developing member is started to separate from the image bearing member after a trailing end of an image forming area on the image bearing member with respect to a moving direction of a surface of the image bearing member passes through the primary transfer position, and a second control in which the developing member is started to separate from the image bearing member after the trailing end of the image in the image forming area on the image bearing member with respect to the moving direction of the surface of the image bearing member passes through the developing position and before the trailing end of the image forming area reaches the primary transfer position.

Further features of the present invention will become apparent from the following description of exemplary embodiments with reference to the attached drawings.

Figure 3:
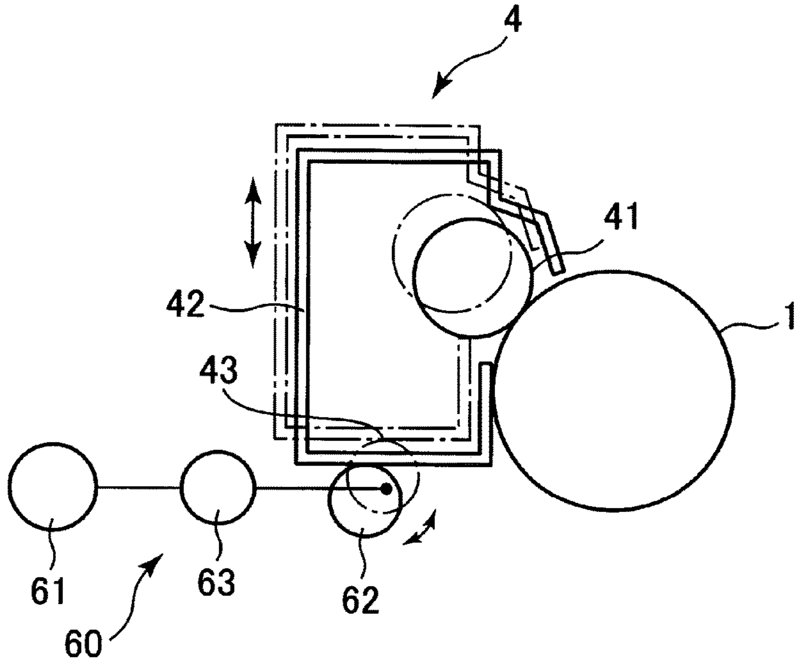
Figure 3:
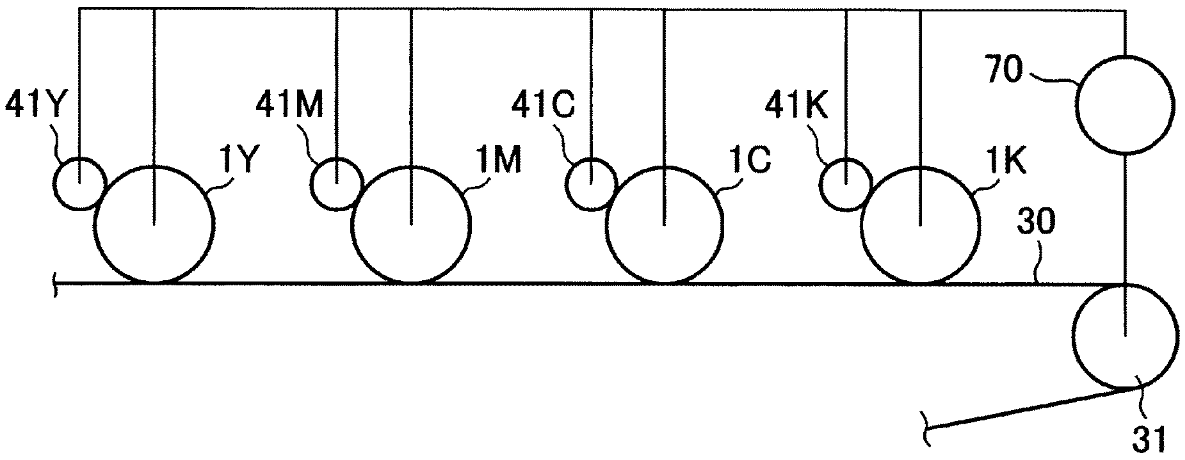

Part (a) of FIG. 3 is a schematic diagram of contact-and-separation mechanism, and Part (b) of FIG. 3 is a schematic diagram of the drive configuration.

Figure 4:
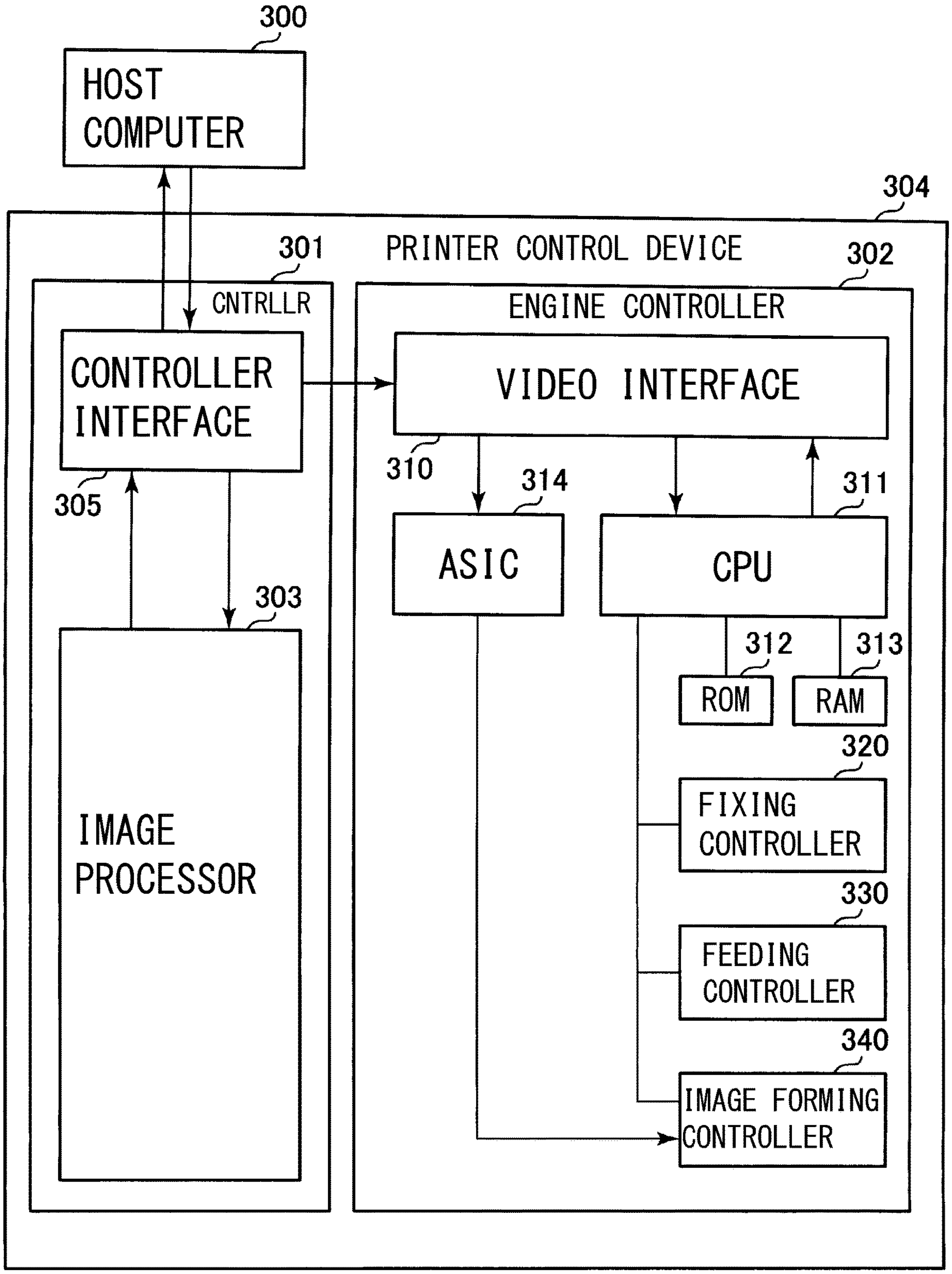

FIG. 4 is a block diagram showing the configuration of the printer controlling unit.

Figure 5:
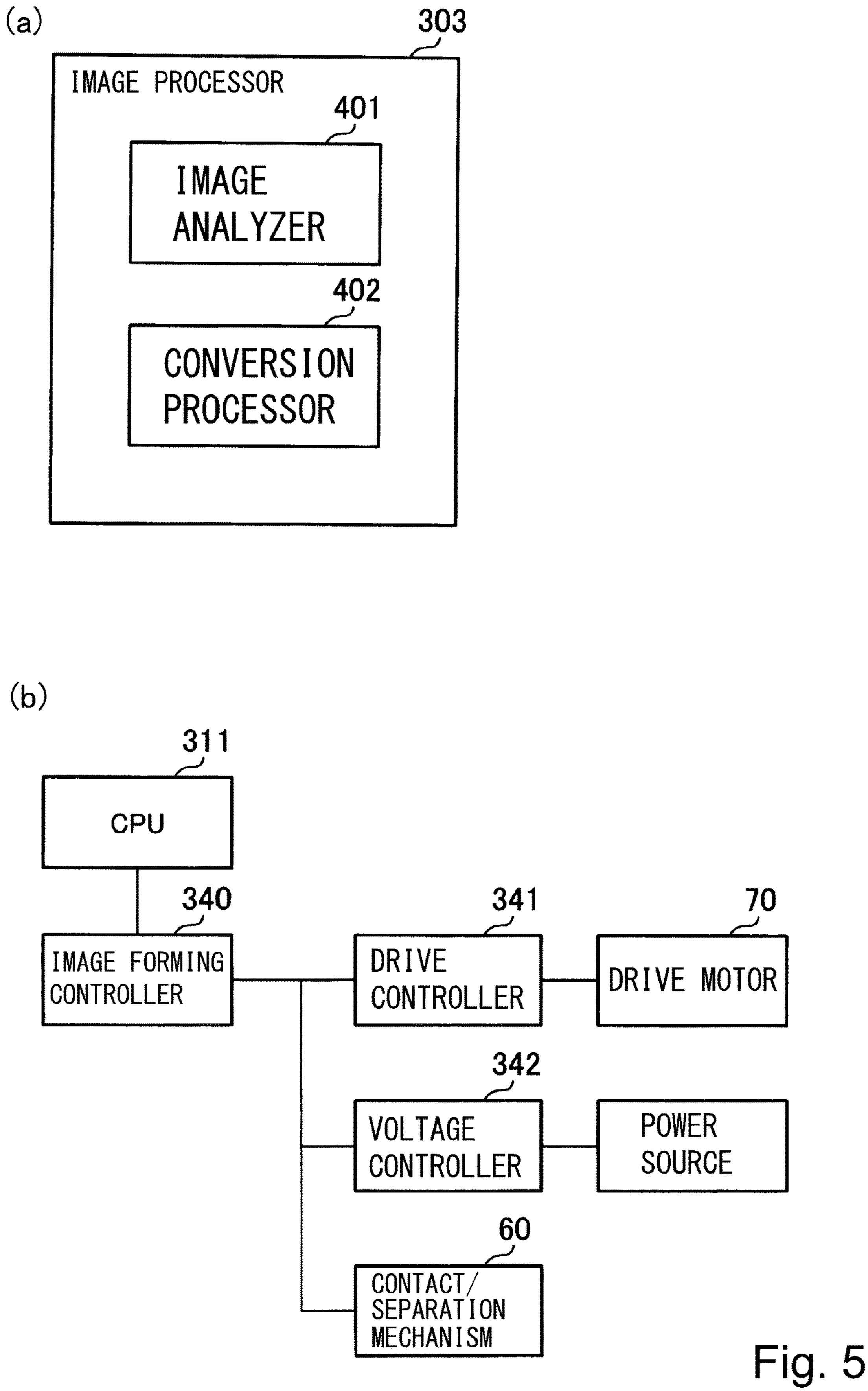

Part (a) of FIG. 5 is a functional block diagram of the image processing portion, and Part (b) of FIG. 5 is a block diagram showing the control system of the image forming controller.

Figure 6:
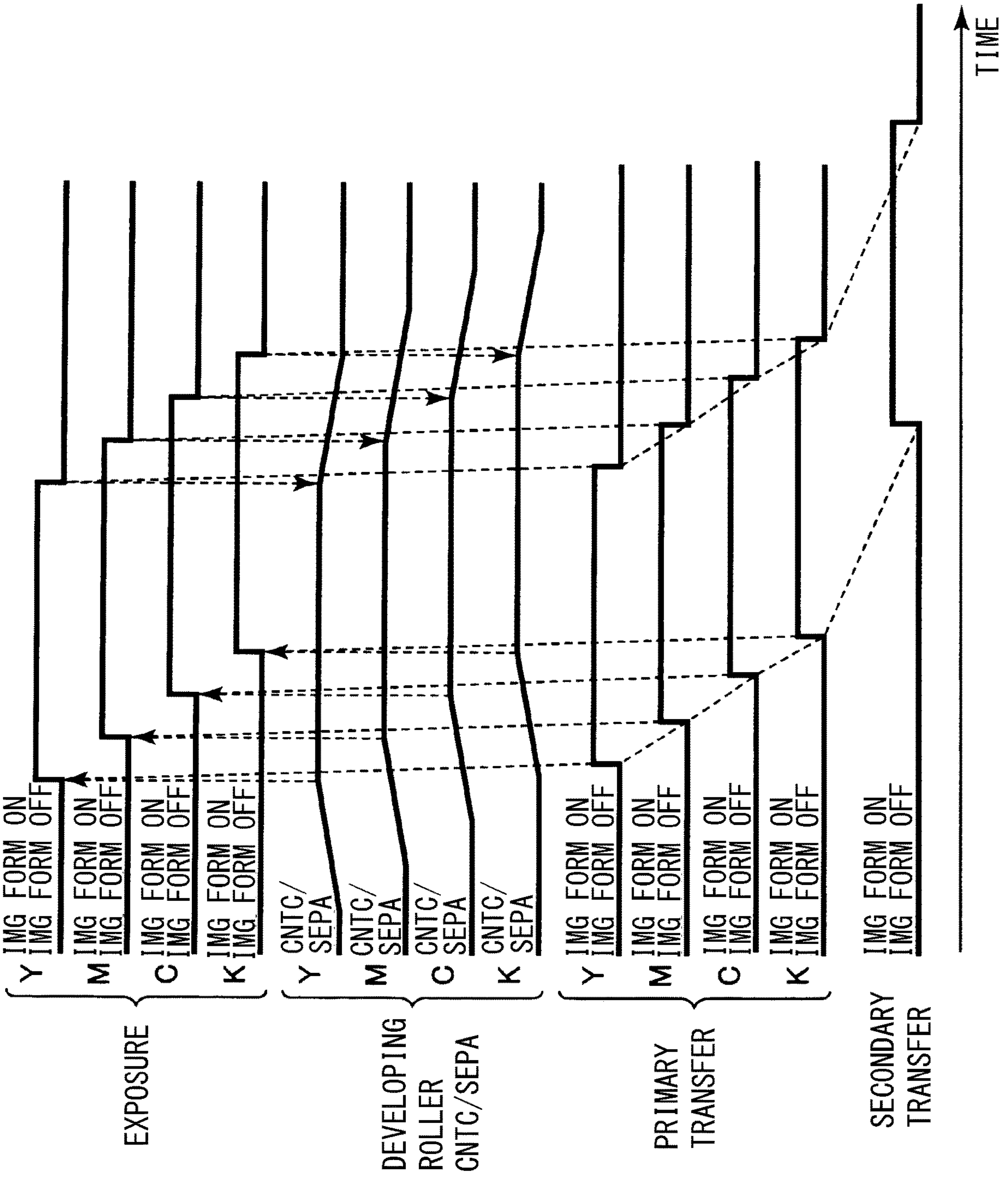

FIG. 6 is a timing chart showing the contact-and-separation operation of a developing roller in the conventional example.

Figure 7:
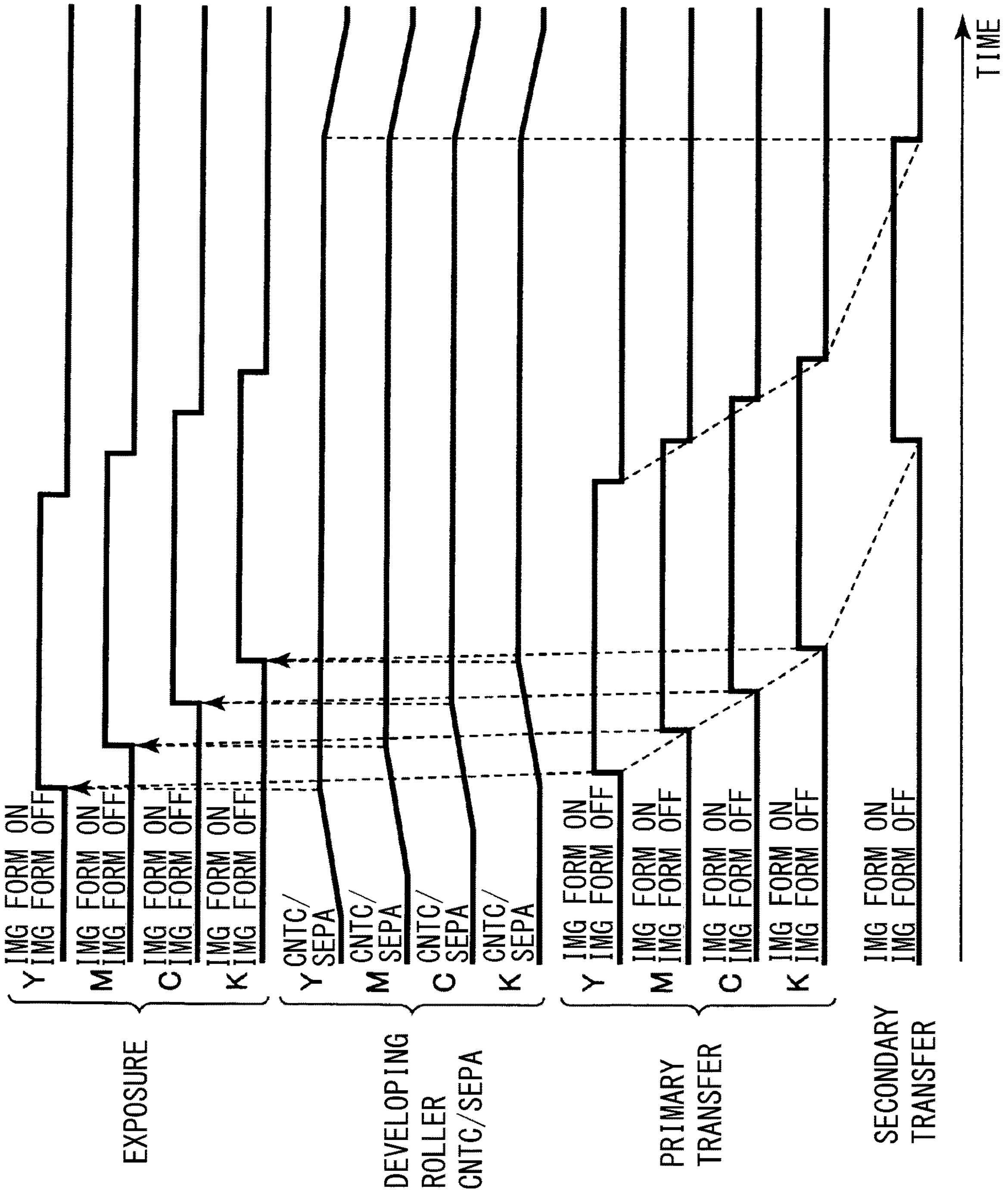

FIG. 7 is a timing chart showing the first control of a separation operation in the first embodiment.

Figure 8:
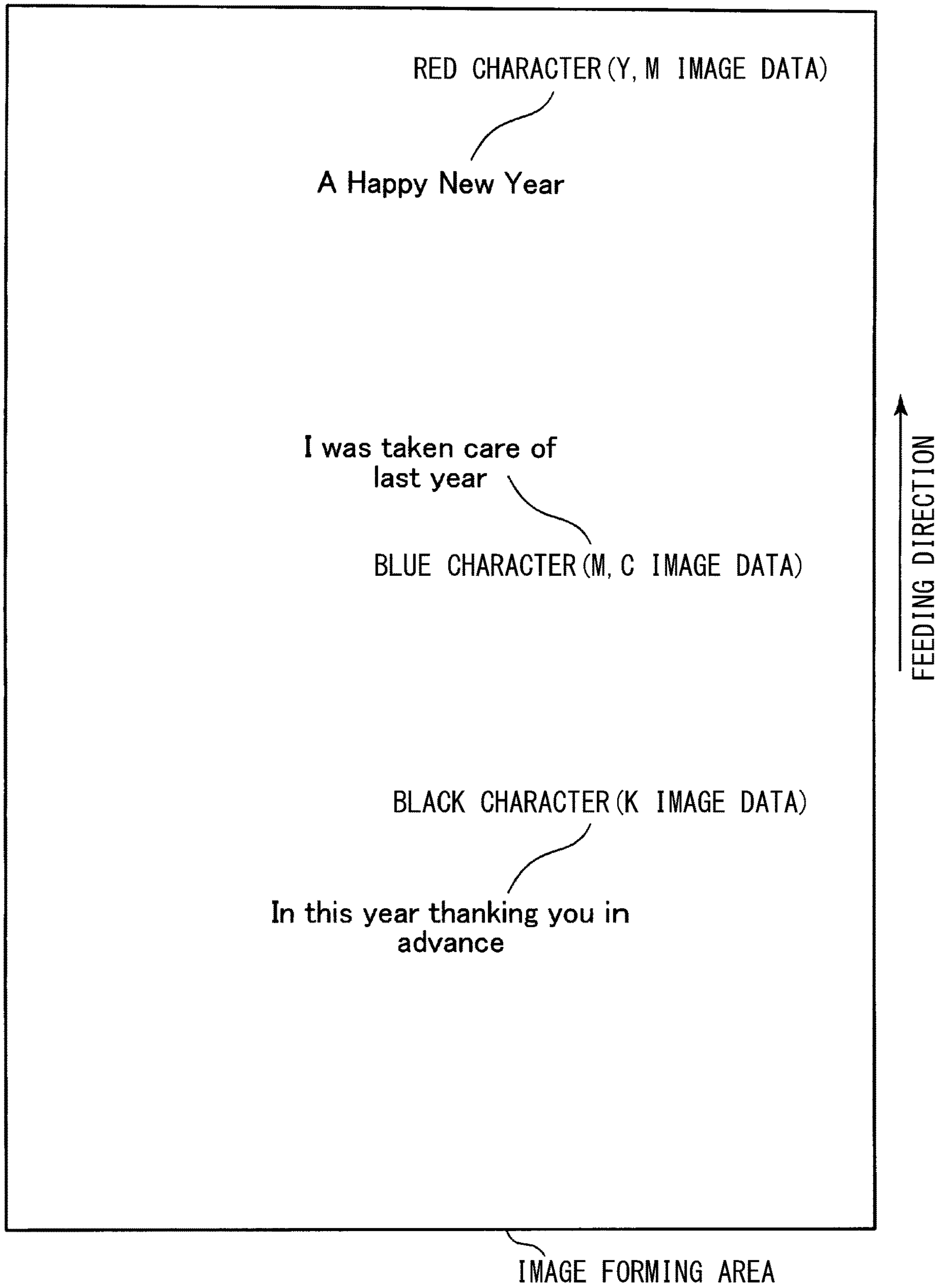

FIG. 8 is a schematic drawing showing an example of an output image.

Figure 9:
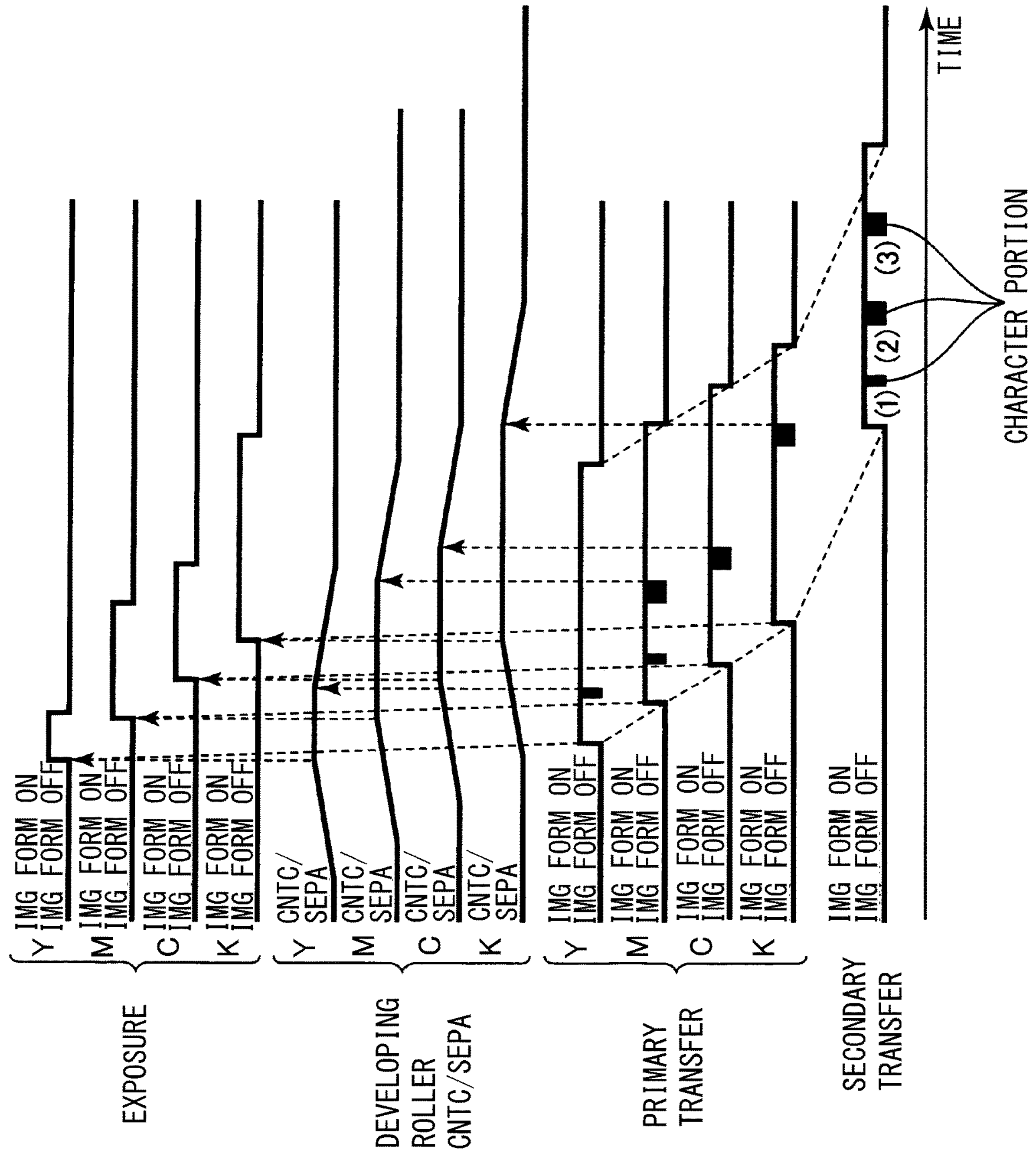

FIG. 9 is a timing chart to illustrate the second control of a separation operation in the first embodiment.

Figure 10:
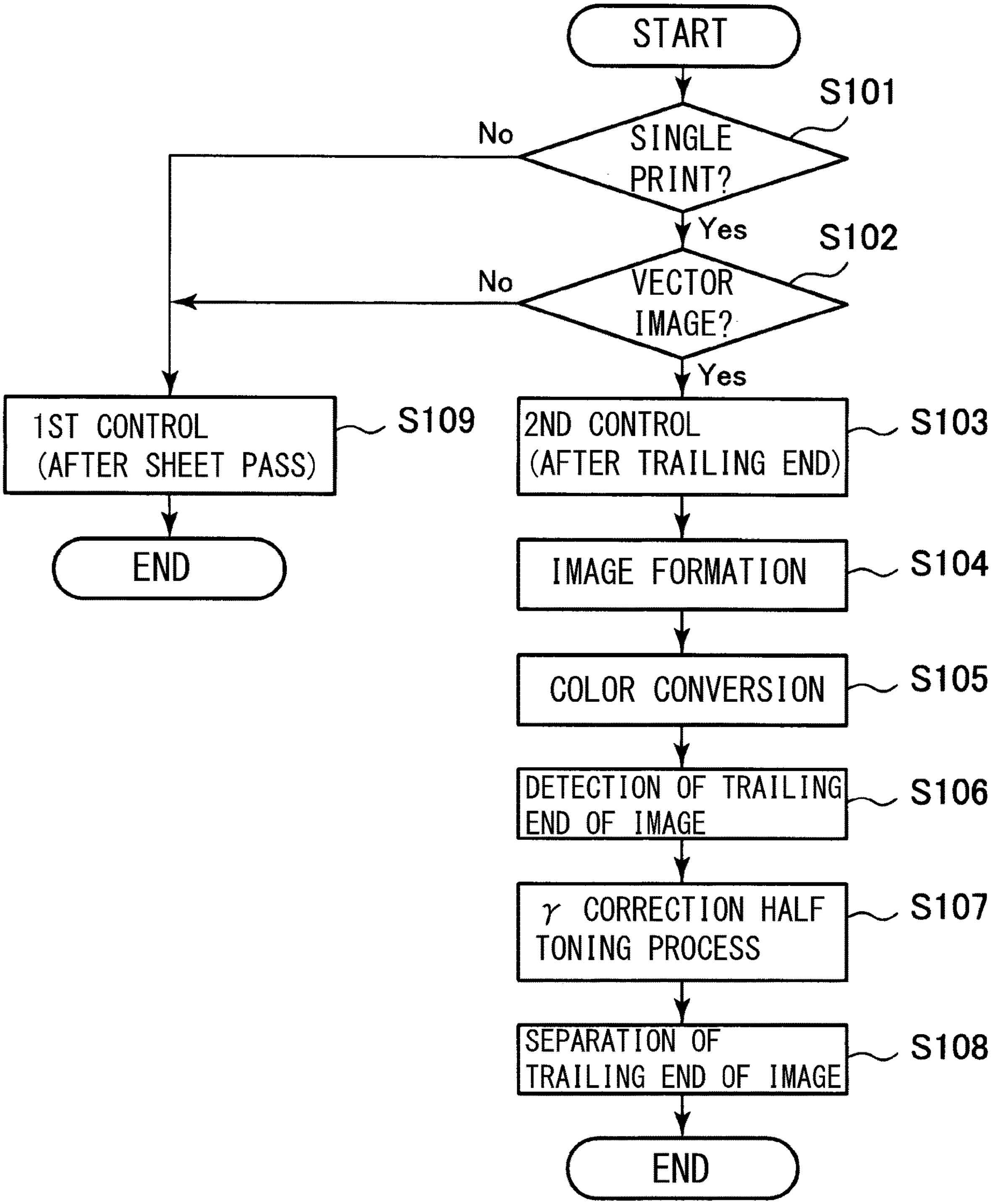

FIG. 10 is a flowchart showing the procedure for determining the separation operation in the first embodiment.

Figure 11:
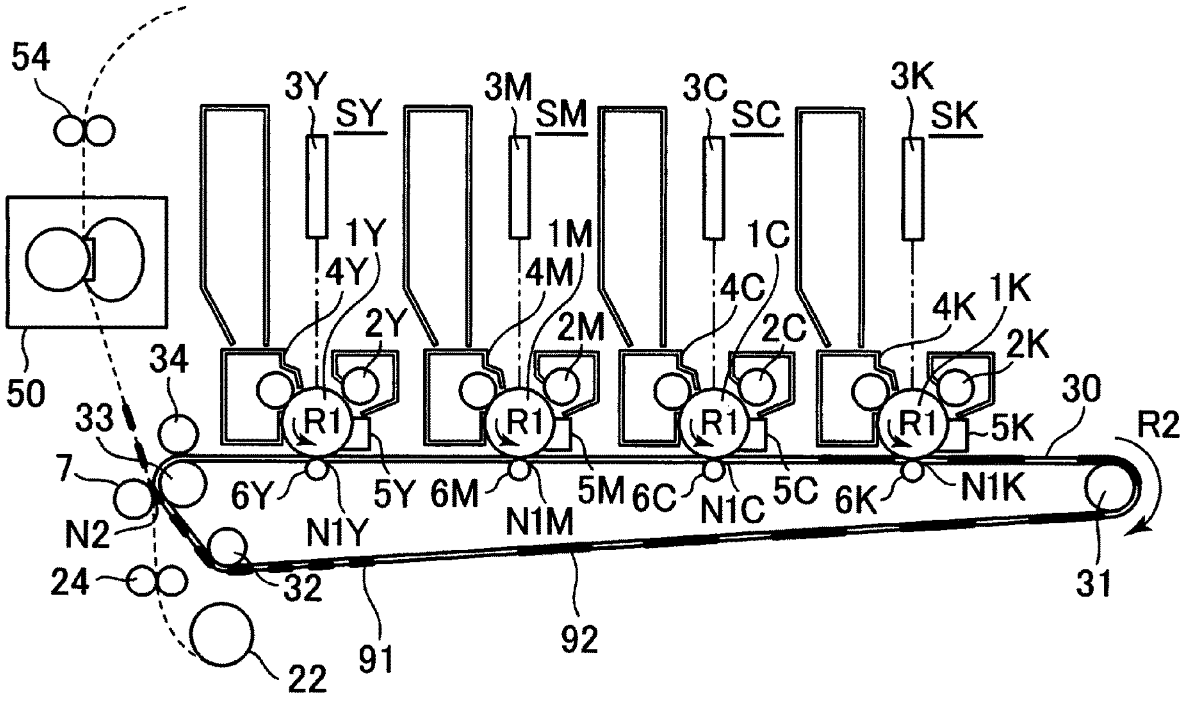

FIG. 11 is a schematic cross-sectional drawing showing the positioning of images during continuous printing in the second embodiment of the image forming apparatus.

Figure 12:
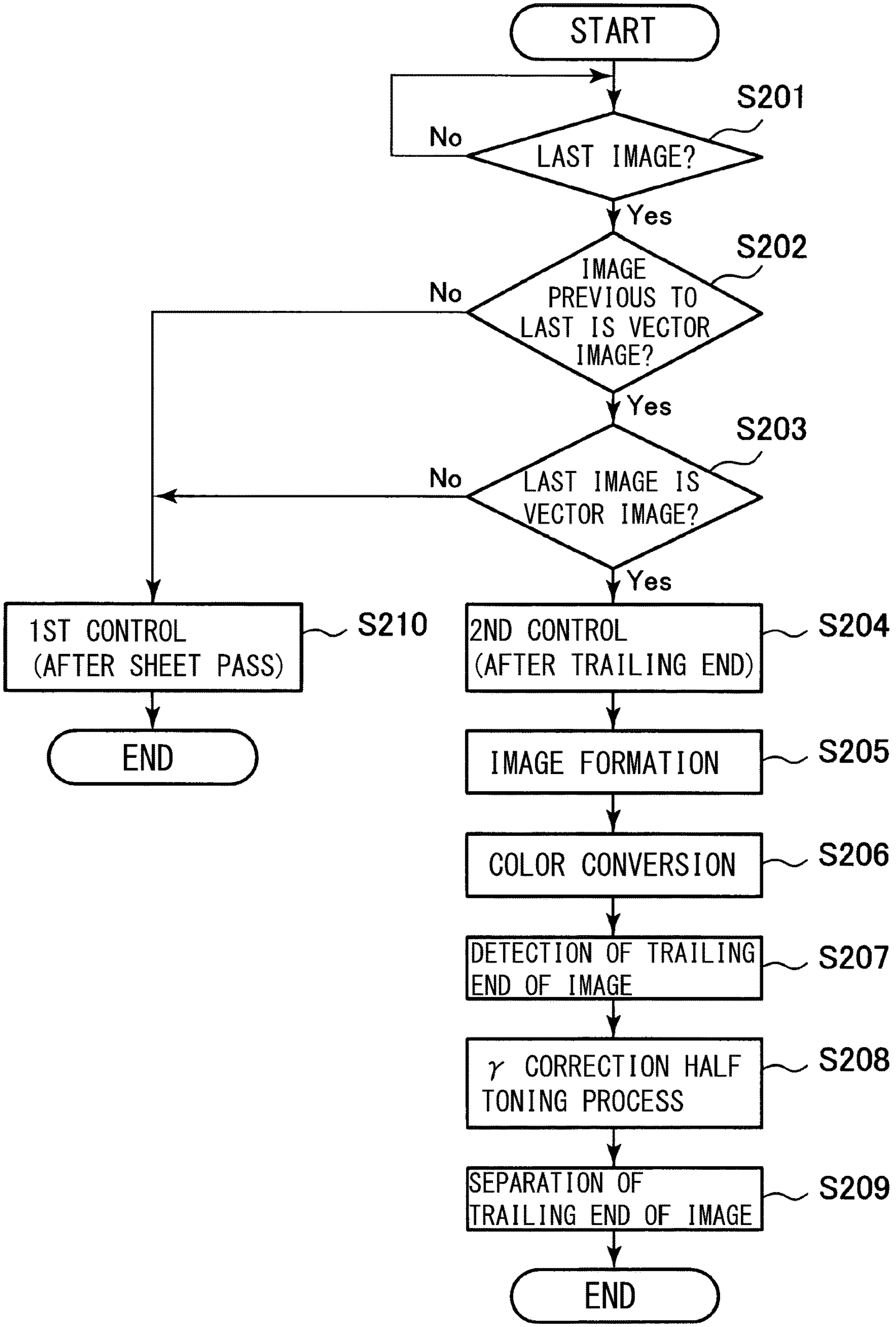

FIG. 12 is a flowchart showing the procedure for determining separation operation in the second embodiment.

Figure 13:
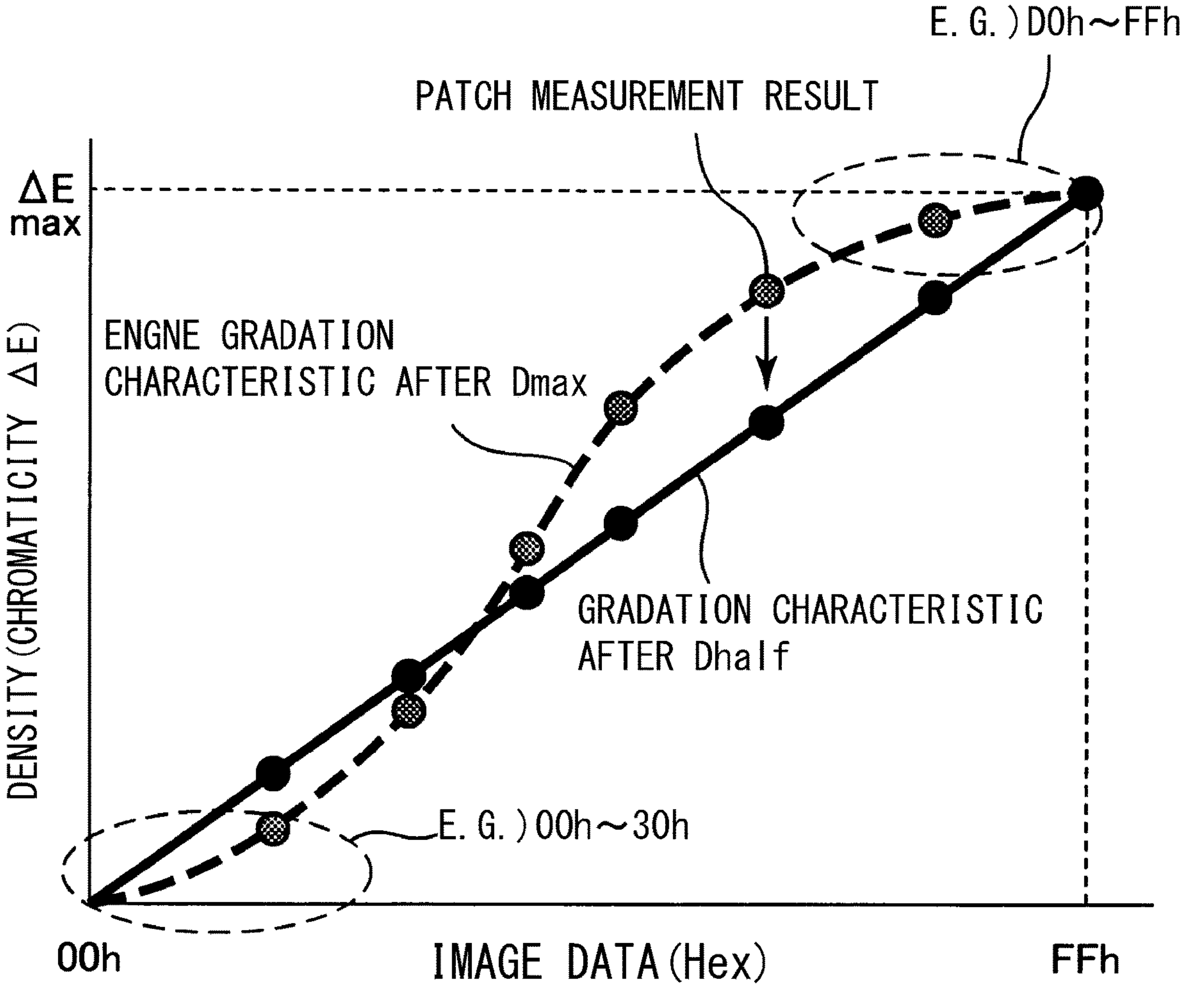

FIG. 13 is a graph showing an example of the relationship between image data and image density.

DESCRIPTION OF THE EMBODIMENTS

The following is a more detailed description of the image forming apparatus of the present invention in accordance with the drawings.

1. Configuration and Operation of an Image Forming Apparatus

Figure 1:
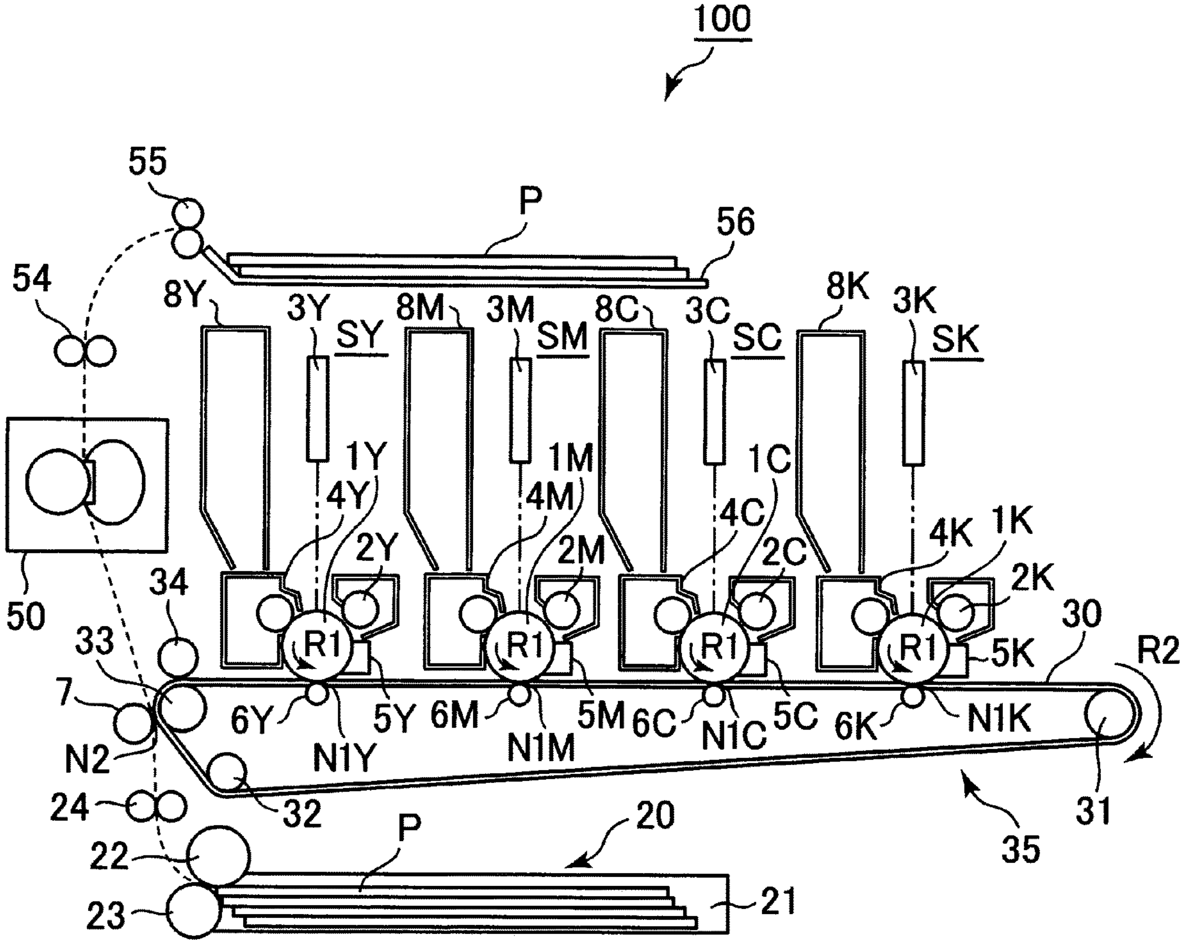
FIG. 1 is a schematic cross-sectional view of the image forming apparatus.

FIG. 1 is a schematic cross-sectional drawing of the present embodiment's image forming apparatus 100. The image forming apparatus 100 of the present embodiment is a color laser printer adopting the intermediary transfer method and the in-line method, capable of forming full-color images using the electrophotographic method.

Figure 2:
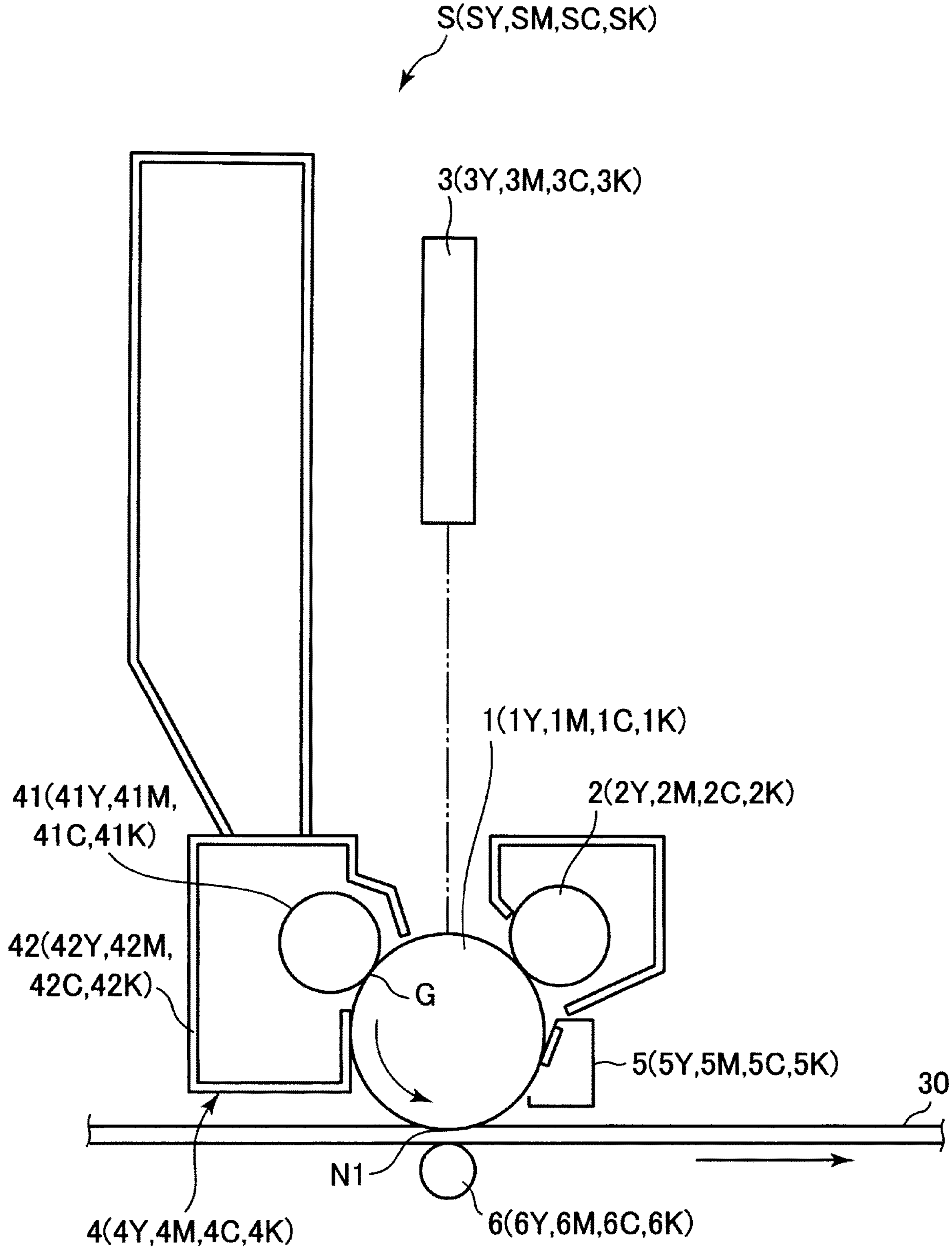
FIG. 2 is a schematic cross-sectional view of the image forming portion.

The image forming apparatus 100 has four image forming portion SY, SM, SC, and SK that form yellow (Y), magenta (M), cyan (C), and black (K) images, respectively, as multiple image forming portions S (stations). Elements having the same or corresponding function or configuration in each image forming portion SY, SM, SC, and SK may be described in general terms by omitting Y, M, C, and K at the end of the code indicating that the element is for one of the colors. FIG. 2 is a schematic cross-sectional drawing showing the configuration of one representative image forming portion S. In the present embodiment, the image forming portion S consists of a photosensitive drum 1 (1Y, 1M, 1C, 1K), a charging roller 2 (2Y, 2M, 2C, 2K), a developing device 4 (4Y, 4M, 4C, 4K), a cleaning device 5 (5Y, 5M, 5C, 5K) and a toner cartridge 8 (8Y, 8M, 8C, 8K), as described below.

The image forming apparatus 100 forms and outputs an image on a recording material P in the following manner. In other words, an electrostatic latent image is formed by exposure controlled based on image signals, and this electrostatic latent image is developed to form a monochromatic toner image. The monochromatic toner image is then superimposed to form a multicolor toner image, and the multicolor toner image is transferred to a recording material P and then fixed to the recording material P.

In the image forming portion S, a photosensitive drum 1, which is a rotatable drum-type (cylindrical) photosensitive member (electrophotographic photosensitive member), is arranged as an image bearing member. In the present embodiment, the photosensitive drum 1 consists of an organic photoconductive layer applied to the periphery of an aluminum cylinder. The photosensitive drum 1 is driven in the direction of arrow R1 (counterclockwise direction) in FIG. 1 at a predetermined peripheral speed (process speed) by the drive power transmitted from the drive motor as the driving source, which is described later. The surface of the rotating photosensitive drum 1 is charged to a predetermined potential of a predetermined polarity (negative polarity in the present embodiment) by the charging roller 2, a roller-type charging member as a charging means. During the charging process, a predetermined charging voltage (charging bias), a negative polarity DC voltage, is applied to a charging roller 2 by a charging power supply (not shown). The charging roller 2 contacts the photosensitive drum 1 and rotates driven by the rotation of the photosensitive drum 1. The position on the photosensitive drum 1 where the charging process is performed in the rotating direction of the photosensitive drum 1 is the charging position. The charging roller 2 electrically charges the photosensitive drum 1 by electric discharge that occurs in at least one of the minute air gaps between the photosensitive drum 1 and the charging roller 2, which are formed upstream and downstream of the contact area between the photosensitive drum 1 and the charging roller 2 (charging nip portion) in the rotating direction of the photosensitive drum 1. For simplicity, however, it may be assumed that the charging process is performed in the charging nip portion.

The surface of the electrically charged photosensitive drum 1 is scanned and exposed by a laser scanner 3, which is an exposure device as an exposure means, to form an electrostatic latent image on the photosensitive drum 1. In each image forming portion SY, SM, SC, SK, the laser scanner 3 irradiates a laser beam onto the photosensitive drum 1 based on an image information of the color component corresponding to the respective image forming portion S to form an electrostatic latent image on the photosensitive drum 1 according to the image information. The laser scanner 3 has a laser driver, a laser diode, a polygon mirror, and an optical lens system. The laser scanner 3 scans the laser beam substantially parallel to the direction of the axis of rotation of the photosensitive drum 1. The laser scanner 3 scans the laser beam substantially parallel to the moving direction of the surface of the photosensitive drum 1 as the photosensitive drum 1 rotates. The direction of the axis of rotation of the photosensitive drum 1 (the direction substantially orthogonal to the direction of surface movement) is also referred to as the "main scanning direction." The direction that is roughly orthogonal to the "main scanning direction" is also referred to as the "sub-scanning direction." The position on the photosensitive drum 1 where the exposure by the exposure device 3 takes place in the direction of rotation of the photosensitive drum 1 is the exposure position.

The electrostatic latent image formed on the photosensitive drum 1 is developed (visualized) by supplying toner as developer by a developing device 4 as the developing means, and a toner image (toner image, developer image) is formed on the photosensitive drum 1. The developing device 4 has a developing roller 41 as a developing member (developer bearer) and a developing container 42 that contains toner as a developer (FIG. 2). The developing device 4 is configured to allow the developing roller 41 to contact and separate from the photosensitive drum 1. As described in detail later, the developing device 4 can be moved by a contact-and-separation mechanism 60 (part (a) of FIG. 3) to a contact position where the developing roller 41 contacts the photosensitive drum 1, and to a separation position where the developing roller 41 is separated from the photosensitive drum 1. During the development process, the developing roller 41 contacts the photosensitive drum 1. During the development process, the developing roller 41 is transmitted drive power from the driving motor as a driving source, which is described below and is driven to rotate in a direction where the moving direction of the surface of the photosensitive drum 1 and the surface of the developing roller 41 are in the forward direction at the contact with the photosensitive drum 1. During the development process, a predetermined development voltage (development bias), a DC voltage of negative polarity, is applied to the developing roller 41 by a developing power supply (not shown). In the present embodiment, toner charged with the same polarity as that of the photosensitive drum 1 (negative polarity in the present embodiment) adheres to the exposed area (image area) on the photosensitive drum 1, where the absolute value of potential has decreased due to exposure after uniformly charged processing (reverse development). In the present embodiment, the normal charge polarity of the toner, which is the charge polarity of the toner during development, is negative polarity. The position on the photosensitive drum 1 where the toner is supplied by the developing roller 41 in the rotating direction of the photosensitive drum 1 (the position where the developing roller 41 contacts the photosensitive drum 1) is the developing position G.

Opposed to the four photosensitive drums 1Y, 1M, 1C, and 1K is an intermediary transfer belt 30, which is composed of an endless belt made of resin as an intermediary transfer member. The intermediary transfer belt 30 is stretched over a driving roller 31, a secondary transfer front roller 32, and a secondary transfer opposing roller 33 as a plurality of tensioning rollers (support rollers). The intermediary transfer belt 30 contacts the four photosensitive drums 1Y, 1M, 1C, and 1K and rotates (moves circumferentially) in a direction where the moving direction of the surface of the photosensitive drum 1 and that of the intermediary transfer belt 30 are in the forward direction at its contact area.

The intermediary transfer belt 30 is driven by the drive roller 31, which is driven by the drive motor as the driving source described below, and rotates (moves clockwise) in the direction of arrow R2 in FIG. 1 at a peripheral speed corresponding to the peripheral speed of the photosensitive drum 1. The driving roller 31 serves as a tension roller that imparts a predetermined tension to the intermediary transfer belt 30. On the inner circumferential side of the intermediary transfer belt 30, primary transfer rollers 6Y, 6M, 6C, and 6K, which are a roller-type primary transfer member as primary transfer means, are arranged corresponding to each photosensitive drum 1Y, 1M, 1C, 1K. A primary transfer roller 6 contacts the inner circumference of the intermediary transfer belt 30 and presses the intermediary transfer belt 30 toward the photosensitive drum 1 to form the primary transfer portion (primary transfer nip portion) N1, which is the contact area between the photosensitive drum 1 and the intermediary transfer belt 30. The secondary transfer front roller 32, secondary transfer opposing roller 33, and each primary transfer roller 6 rotate driven by the rotation of the intermediary transfer belt 30. The toner image formed on the photosensitive drum 1 is transferred (primary transfer) onto the intermediary transfer belt 30 as a rotating transfer member by the action of the primary transfer roller 6 in the primary transfer portion N1. During the primary transfer process, a primary transfer voltage (primary transfer bias) is applied to the primary transfer roller 6 by the primary transfer power source (not shown), which is a direct current voltage of the opposite polarity (positive polarity in the present embodiment) to the regular charging polarity of the toner. For example, when forming a full-color image, the Y, M, C, and K single-color toner images formed on each photosensitive drum 1 are transferred sequentially by overlaying them on the intermediary transfer belt 30. The position on the photosensitive drum 1 where the primary transfer takes place in the rotation direction of the photosensitive drum 1 (corresponding to primary transfer portion N1) is the primary transfer position. The intermediary transfer unit 35 as a transfer device is composed of an intermediary transfer belt 30, a plurality of tension rollers 31, 32, 33, each primary transfer roller 6, and the like.

On the outer circumferential side of the intermediary transfer belt 30, a secondary transfer roller 7, which is a roller type secondary transfer member as a secondary transfer means, is located at a position opposite to the secondary transfer opposing roller 33. The secondary transfer roller 7 is pressed toward the secondary transfer opposing roller 33 and contacts the secondary transfer roller 33 via the intermediary transfer belt 30 to form the secondary transfer portion (secondary transfer nip portion) N2 which is the contact portion between the intermediary transfer belt 30 and the secondary transfer roller 7. The secondary transfer roller 7 rotates driven by the rotation of the intermediary transfer belt 30. The toner image formed on the intermediary transfer belt 30 is transferred (secondary transfer) onto the recording material P as a transferred member, which is nipped between the intermediary transfer belt 30 and the secondary transfer roller 7 and fed by the action of the secondary transfer roller 7 in the secondary transfer portion N2. During the secondary transfer process, a secondary transfer voltage (secondary transfer bias) is applied to the secondary transfer roller 7 by the secondary transfer power source (not shown), which is a direct current voltage of the opposite polarity (positive polarity in the present embodiment) of the regular charging polarity of the toner. The position on the intermediary transfer belt 30 where the secondary transfer takes place in the rotation direction of the intermediary transfer belt 30 (corresponding to the secondary transfer portion N2) is the secondary transfer position.

Recording material (recording medium, transfer material, sheet) P, such as paper or plastic sheet, is supplied to the secondary transfer portion N2 by the paper feeding portion 20. Paper feeding refers to feeding a recording material P, and the recording material P is not limited to paper. The paper feeding portion 20 has a recording material storage portion 21, a paper feeding roller 22, and a retard roller 23.

The recording material P is stored in the recording material storage portion 21, and is separated and fed out one by one from the recording material storage portion 21 by a paper feeding roller 22 and a retard roller 23 as paper feeding members. The recording material P fed from the recording material storage portion 21 is nipped by a resist roller pair 24 as a feeding member, timed with the toner image on the intermediary transfer belt 30, and fed to the secondary transfer portion N2.

The recording material P on which the toner image has been transferred is fed to a fixing device 50 as a fixing means. The fixing device 50 fixes (melts and adheres) the toner image on the recording material P by heating and pressing while narrowly nipping and feeding the recording material P that bears the unfixed toner image. After the toner image is fixed, the recording material P is then discharged (output) to a discharge tray 56 provided outside the apparatus main body of the image forming apparatus 100 by means of a feeding roller 54 and a discharge roller 55.

On the other hand, any remaining transfer toner on the photosensitive drum 1 after primary transfer is removed and collected from the photosensitive drum 1 by a cleaning device 5 as a cleaning means. On the outer circumferential side of the intermediary transfer belt 30, a residual toner charging roller 34 is positioned opposite to the secondary transfer opposing roller 33 as a means of charging the residual toner. The residual transfer toner remaining on the intermediary transfer belt 30 after the secondary transfer is charged by the residual toner charging roller 34 to the opposite polarity of the regular charging polarity. This toner is collected electrostatically on the photosensitive drum 1 in the primary transfer portion N1 (e.g., primary transfer portion N1Y of the image forming portion S for Y) by the action of a voltage of the opposite polarity of the regular charging polarity of the toner applied to the primary transfer roller 6. This toner is then removed and collected from the photosensitive drum 1 by the cleaning device 5.

In the present embodiment, in each image forming portion S, the photosensitive drum 1, the charging roller 2, the developing device 4, and the cleaning device 5 as the processing means acting thereon, together constitute a process cartridge that can be attached to and detached from the apparatus main body of the image forming apparatus 100.

As shown in part (a) of FIG. 3, the image forming apparatus 100 of the present embodiment has a contact-and-separation mechanism 60 as a means of switching the contact state between the photosensitive drum 1 and the developing roller 41 of each image forming portion S. Part (a) of FIG. 3 schematically shows the configuration with respect to the developing device 4 of one representative image forming portion S. In the present embodiment, the contact-and-separation mechanism 60 is configured as follows. The developer container 42 of the developing device 4 is, for example, rotatable (pivotable) around a rotational axis that is substantially parallel to the rotational axis direction of the photosensitive drum 1. The developer container 42 is attached by a spring or other urging member so that the developing roller 41, which is rotatably supported by the developer container 42, rotates in the contact direction with the photosensitive drum 1. The contact-and-separation mechanism 60 has a contact-and-separation motor 61 and a moving member (such as a cam) 62 driven by the contact-and-separation motor 61. The contact-and-separation mechanism 60 can control the pressing and releasing of the moving member 62 against the receiving portion 43 in the developer container 42 of the developing device 4. By pressing the receiving portion 43 with the moving member 62, the developing device 4 can be placed in a separated position where the developing roller 41 is separated from the photosensitive drum 1. By releasing the pressure of the receiving portion 43 by the moving member 62, the developing device 4 can be placed in the contact position where the developing roller 41 is in contact with the photosensitive drum 1. In the present embodiment, the contact-and-separation mechanism 60 has a moving member 62 independently for each image forming portion SY, SM, SC, and SK. Moreover, in the present embodiment, the contact-and-separation mechanism 60 has a common contact-and-separation motor 61 for each image forming portion SY, SM, SC, and SK. In the present embodiment, the contact-and-separation mechanism 60 has a clutch 63 as a drive transmission means between the contact-and-separation motor 61 and the moving member 62 of each image forming portion SY, SM, SC, SK. This allows the transmission and release of drive from the contact-and-separation motor 61 to the moving member 62 to be switched to independently control the contact-and-separation state (especially the separation timing) between the developing roller 41 and the photosensitive drum 1 in each image forming portion SY, SM, SC, SK at the desired timing. The configuration of the contact-and-separation mechanism is not limited to that of the present embodiment. It is sufficient to have a configuration that can independently control the contact-and-separation state (especially separation timing) between the developing roller 41 of each image forming portion SY, SM, SC, SK, and the photosensitive drum 1, according to the present embodiment. In the present embodiment, the contact-and-separation mechanism 60 roughly brings the developing roller 41 into contact with the photosensitive drum 1 during the developing process. Also in the present embodiment, the contact-and-separation mechanism 60, when the image forming apparatus 100 is deactivated (e.g., in a standby state waiting for a print job, or in a power-off state), the developer roller 41 is separated from the photosensitive drum 1. The contact-and-separation timing between the developing roller 41 and the photosensitive drum 1 in each image forming portion SY, SM, SC, and SK is described in detail below.

As shown in part (b) of FIG. 3, in the present embodiment, the driving motor 70 as a driving source for the photosensitive drum 1 and the developing roller 41 in each image forming portion SY, SM, SC, and SK is common to all of them. Furthermore, in the present embodiment, in addition to the photosensitive drum 1 and developing roller 41 of each image forming portion SY, SM, SC, SK, the driving motor 70 as a driving source for the intermediary transfer belt 30 (driving roller 31) is also common. In other words, in the present embodiment, the image forming apparatus 100 has a driving motor 70 as a common driving source for the photosensitive drum 1 and developing roller 41 of each image forming portion SY, SM, SC, and SK, and intermediary transfer belt 30 (driving roller 31). A clutch or other means of drive transmission may optionally be provided between at least one of each photosensitive drum 1, each developing roller 41, driving roller 31, and the driving motor 70. This makes it possible, for example, to drive and stop the rotation of the developing roller 41 of each image forming portion SY, SM, SC, and SK independently. Alternatively, for example, in each of the image forming portions SY, SM, SC, and SK, the drive power transmitted to the photosensitive drum 1 may be configured to be transmitted to the developing roller 41 by connecting a gear rotating on the same axis as the photosensitive drum 1 and a gear rotating on the same axis as the developing roller 41. In this case, for example, the configuration may be such that the above gears are connected to each other in conjunction with the movement of the developing roller 41 against the photosensitive drum 1, causing the developing roller 41 to rotate.

2. Control System

FIG. 4 is a block diagram showing the control system (printer system configuration) of the image forming apparatus 100 according to the present embodiment. The image forming apparatus 100 has a printer control unit 304 as controller (control means). The printer control unit 304 connects to and communicates with a host computer 300 as the host device external to the image forming apparatus 100 using a controller interface 305 described below.

The printer control unit 304 has, broadly speaking, a controller portion 301 and an engine controller 302. Controller portion 301 includes the controller interface 305 and an image processing portion 303. The engine controller 302 has a video interface 310, CPU 311, ROM 312, RAM 313, ASIC 314, fixing controller 320, paper feeding controller 330, and image forming controller 340.

In the controller portion 301, the image processing portion 303 receives print job information described in a page description language (PDL) such as PCL or PostScript from the host computer 300 via the controller interface 305. Based on this print job information, the image processing portion 303 performs color conversion such as bit mapping of RGB, converting RGB to toner color data YMCK, and halftoning by dithering intermediate tone images. The image processing portion 303 then sends the image information to the video interface 310 of the engine controller 302.

The above image information includes information that controls the lighting timing of the laser scanner 3, information on the print mode that controls process conditions such as temperature control temperature and transfer bias, and information on the size of the image. The above information on the lighting timing of the laser scanner 3 is transmitted to an ASIC (Application Specific Integrated Circuit) 314. The ASIC 314 controls some of the image forming portions that are controlled by the image forming portion 340, such as the laser scanner 3. Meanwhile, the above print mode information and image size information are sent to the CPU (Central Processing Unit) 311.

The CPU 311 performs, for example, the following controls. In other words, it controls the temperature of the fixing device 50 in the fixing controller 320 and the operation of the paper feeding portion 20 (operation interval, etc.) in the paper feeding controller 330. It also controls the process speed, various voltages (developing voltage, charging voltage, transfer voltage, etc.), and the operation of the contact-and-separation mechanism 60 (contact or separation of the developing roller 41 to and from the photosensitive drum 1) in the image forming controller 340. The CPU 311 performs the above controls, etc. by storing information in RAM 313, using programs stored in ROM 312 or RAM 313, referring to information stored in ROM 312 or RAM 313, etc. as necessary.

Furthermore, the controller portion 301 sends print commands, cancellation instructions, etc. to the engine controller 302 in response to instructions given by the user (operator) in the host computer 300, and controls operations such as starting and terminating print operations.

Part (a) of FIG. 5 shows the functional block of the image processing portion 303. In the present embodiment, the image processing portion 303 consists of an image analysis portion 401 as an image analysis method and another image processing portion as a conversion and other processing portion 402.

In the present embodiment, the image analysis portion 401 analyzes the attributes of the image data input to the image forming apparatus 100 (hereinafter simply referred to as "image attributes") to determine the vector image. A vector image is a description of characters (text image) or figures (graphics) with numerical values or other data. For example, if the image data is vector image data that specifies a character that is a vector image, the image data (vector image data) includes information indicating that it is a character and information specifying the type of character. For example, if the image data is vector image data that defines a shape that is a vector image, the image data (vector image data) includes information for expressing the type of shape, such as rectangle or circle. On the other hand, if the image data is raster image data that defines an image that is a raster image, the image data (raster image data) includes information indicating that it is an image. Therefore, the image analysis portion 401 can determine, based on the print job information (input image information) input to the image forming apparatus 100 from the host computer 300 prior to development (image conversion), whether the image attribute is a vector image or not. In other words, it is possible to determine whether the image data is vector image data or not.

A vector image is a form of expression in computer graphics that represents an image as a collection of analytical geometric "figures" such as circles and lines. It is compared with a "bitmap image" (raster format), which scans a flat surface and represents an image by a collection of shades of each point. Compared to a bitmap image, which attempts to represent an image as a set of pixels, a vector image has the property that its graphic image is not fundamentally degraded when it is enlarged, reduced, or otherwise deformed. Since vector images are composed of simple shapes, they are less affected by load fluctuations of the driving motor 70 during image formation, as described below, than bitmap images, which are composed of continuous shading of pixels. In other words, a vector image is an image that is difficult to see even if blurring of the image occurs due to load fluctuations of the driving motor 70.

In the conversion and other processing portion 402, image conversion (RIP processing), color conversion, halftoning, and other processes are performed to convert image data into bitmaps. Image conversion (RIP (Raster Image Processor) processing) is the process of analyzing print job information including PDL sent from the host computer 300 and converting (expanding) it into a raster image. Then, in the present embodiment, the conversion and other processing portion 402 can determine the trailing end of the Y, M, C, and K color images based on the toner respective color data YMCK obtained by color conversion (hereinafter simply "image trailing end"). Here, the leading end or trailing end of the image (toner image) or image forming area refers to the leading end or trailing end in the sub-scanning direction, i.e., the moving direction of the surface of the photosensitive drum 1, the intermediary transfer belt 30, or the recording material P, respectively, even if not specifically mentioned. The image forming area is an area that can form a toner image on an image bearing member, an intermediary transfer member, or a recording material corresponding to a single recording material, which is set in advance according to the size of the recording material, the operation mode of image forming, etc. The image forming area is often smaller than the size of the recording material in at least one of the feeding direction of the recording material or the width direction orthogonal thereto. However, it may also be roughly the same as the size of the recording material, or it may be larger than the size of the recording material.

Part (b) of FIG. 5 is a block diagram showing the control system of the various portions of the image forming apparatus 100 by the image forming controller 340. A driving motor 70 is connected to the image forming controller 340 via a driving controller (drive control circuit) 341. The CPU 311 starts and stops the drive of the driving motor 70 via the drive controller 341, controls the drive speed, and so on, by means of the image forming controller 340. The image forming controller 340 is connected to various power sources, such as a charging power source, a developing power source, a primary transfer power source, and a secondary transfer power source, via a voltage controller (voltage control circuit) 342. The CPU 311 starts and stops the output of the said various power sources via the voltage controller 342, and controls the output values, etc., via the image forming controller 340. The contact-and-separation mechanism 60 (more specifically, its contact-and-separation motor 61) is connected to the image forming controller 340. The CPU 311 controls the start and stop of the drive of the contact-and-separation mechanism 60 and other operations via the image forming controller 340.

Here, the image forming apparatus 100 executes a print job, which is a series of operations to form and output an image on a single or multiple recording material P, initiated by a single start instruction. A print job generally has an image forming process, a pre-rotation process, an inter-paper process when images are formed on multiple recording materials P, and a post-rotation process. The image forming process is the period during which the electrostatic latent image of the image to be actually formed and output on the recording material P is formed, the toner image is formed, the primary transfer of the toner image is performed, and the secondary transfer is performed; the image forming time (image forming period) refers to this period. More specifically, the timing during image forming differs at the position where these electrostatic latent image forming, toner image forming, primary transfer of the toner image, and secondary transfer processes are performed. The pre-rotation process is the period of preparatory operations prior to the image forming process, from the time the start instruction is input until the actual start of image forming.

The inter-paper process (inter-recording material process, inter-image forming process) corresponds to the period of time between recording materials P when image forming is continuously performed on multiple recording materials P (continuous printing, continuous image forming). The post-rotation process is the period of time during which the post-image forming process is followed by organizing (preparatory) operations. Non-image forming time (non-image forming period) is a period of time other than during image forming, and includes the pre-rotation process, inter-paper process, and post-rotation process described above, as well as the pre-multi-rotation process, which is a preparatory operation when the image forming apparatus 100 is turned on or returns from sleep mode.

3. Contact-and-Separation Operation of a Developing Roller

3-1. Comparative Example

First, to facilitate understanding of the contact-and-separation operation of the developing roller 41 to the photosensitive drum 1 in the present embodiment, an example of a conventional contact-and-separation operation is described as a comparative example. The comparative example is also described with the same codes for elements that have the same or corresponding functions or configurations as those of the present embodiment.

FIG. 6 is a timing chart showing the outline of the operation timing of each portion in the image forming process for the comparative example. In the comparative example, the driving source of the photosensitive drum 1 and the developing roller 41 in each image forming portion S is independent, and the driving source of the photosensitive drum 1 and the developing roller 41 in each image forming portion S and the intermediary transfer belt 30 (driving roller 31) of each image forming portion S are also independent. FIG. 6 shows the timing chart for printing on a single sheet of recording material P.

When an image forming start signal is input to the image forming apparatus 100, the rotational drive of the intermediary transfer belt 30 and each photosensitive drum 1Y, 1M, 1C, 1K is initiated. Then, the surface of each photosensitive drum 1Y, 1M, 1C, 1K is charged by each charging roller 2Y, 2M, 2C, and 2K. Then, each laser scanner 3Y, 3M, 3C, 3K irradiates laser light onto each photosensitive drum 1Y, 1M, 1C, 1K based on image information to form an electrostatic latent image on each photosensitive drum 1Y, 1M, 1C, 1K. With respect to the exposure in FIG. 6, an image forming ON indicates the period when the image forming area on the photosensitive drum 1 passes through the exposure position in each image forming portion SY, SM, SC, and SK, and an image forming OFF indicates the period outside of that period.

Next, each developing roller 41Y, 41M, 41C, 41K contacts each photosensitive drum 1Y, 1M, 1C, 1K to develop (visualize) the electrostatic latent image on each photosensitive drum 1Y, 1M, 1C, 1K to form a toner image on each photosensitive drum 1Y, 1M, 1C, 1K. The developing roller 41 contacts the photosensitive drum 1 in the order of Y, M, C, and K from the image forming portion S upstream in the moving direction on the surface of the intermediary transfer belt 30 to the image forming portion S downstream. For example, in each image forming portion SY, SM, SC, SK, the contact movement of the developing roller 41 to the photosensitive drum 1 is completed just before the leading end of the image forming area reaches the developing position. In other words, from the upstream image forming portion S to the downstream image forming portion S, the developing roller 41 is in the contact position (contact state) and forms (develops) the image in turn. Thereafter, each developing roller 41Y, 41M, 41C, 41K is separated from each photosensitive drum 1Y, 1M, 1C, 1K. At this time, the developing rollers 41 are separated from the photosensitive drums 1 in the order of Y, M, C, K from the image forming portion S upstream in the moving direction of the surface of the intermediary transfer belt 30 to the image forming portion S downstream. For example, in each image forming portion SY, SM, SC, and SK, immediately after the trailing end of the image forming area passes the primary transfer portion N1, the separation operation of the developing roller 41 from the photosensitive drum 1 starts. In other words, the image forming (developing) process is terminated when the developing roller 41 moves to the separation position (separated state) from the upstream image forming portion S to the downstream image forming portion S in the above-mentioned order. The contact area on the photosensitive drum 1 where the developing roller 41 contacts the photosensitive drum 1 is an area where image formation (development) can be performed for the entire moving direction of the image forming area corresponding to one sheet of recording material P.

The toner image formed on each photosensitive drum 1Y, 1M, 1C, 1K is then electrostatically transferred (primary transfer) onto the intermediary transfer belt 30 in each primary transfer portion N1Y, N1M, N1C, N1K. The toner image formed on the intermediary transfer belt 30 is transferred (secondary transfer) to the recording material P in the secondary transfer portion N2. With respect to primary transfer in FIG. 6, image formation ON indicates the period when the image forming area on the intermediary transfer belt 30 passes through the primary transfer position in each image forming portion SY, SM, SC, and SK. Image formation OFF indicates a period of time other than the primary transfer position. With regard to the secondary transfer in FIG. 6, image formation ON indicates the period when the image forming area on the intermediary transfer belt 30 passes through the secondary transfer position (approximately corresponding to the period when the recording material P passes through the secondary transfer portion N2), while image formation OFF indicates a period other than that period.

The charging process of the photosensitive drum 1 by the charging roller 2, for example, starts at about the same time that the photosensitive drum 1 is driven to rotate (the same is true for the control of the present embodiment, which is described below). The developing roller 41 is driven to rotate before it contacts the photosensitive drum 1 and is stopped after it is separated from the photosensitive drum 1 (the same is true for the control of the present embodiment, which is described below).

3-2. Overview of the Control of the Present Embodiment

Next, the contact-and-separation operation of the developing roller 41 to the photosensitive drum 1 in the present embodiment is described. As mentioned above, in the present embodiment, the driving motor 70 as a driving source for the photosensitive drum 1 and the developing roller 41 in each image forming portion SY, SM, SC, and SK is common. Furthermore, in the present embodiment, in addition to the photosensitive drum 1 and developing roller 41 of each image forming portion SY, SM, SC, SK, the driving motor 70 as a driving source for the intermediary transfer belt 30 (driving roller 31) is also common. Therefore, in the present embodiment, the contact-and-separation operation of the developing roller 41 to the photosensitive drum 1 is set to suppress the occurrence of defects such as image blurring due to the effects of load fluctuations of the driving motor 70, as described above.

The control of the operation of separating the developing roller 41 from the photosensitive drum 1 (hereinafter simply referred to as "separation operation") is configured to switch between first control and second control, based on the image information.

In the first control, the separation operation is started after the trailing end of the image forming area passes through the primary transfer portion N1. More precisely, in the present embodiment, in the first control, the separation operation is started after the trailing end of the image forming area has passed through the primary transfer portion N1 of all (downstream-most) image forming portions S and after passing through secondary transfer portion N2 so as not to overlap with the secondary transfer.

On the other hand, in the second control, in each image forming portion S, the separation operation is started before the trailing end of the image forming area reaches the primary transfer portion N1. More precisely, in the second control, in each image forming portion S, the trailing end of the image in the image forming area is detected, and after the trailing end of the image has passed the developing position and before the trailing end of the image forming area reaches the primary transfer portion N1, the separation operation is started.

In particular, the present embodiment uses image attribute information as image information. If the image attribute of the image to be formed immediately before the separation operation is not a vector image (more precisely, if it contains an image that is not a vector image), the first control is executed as the control of the separation operation. On the other hand, if the image attribute of the image to be formed immediately before the separation operation is a vector image (more precisely, if all images are vector images), second control is performed to control the separation operation.

In the present embodiment, the contacting operation is controlled so that the operation of contacting the developing roller 41 with the photosensitive drum 1 (hereinafter simply referred to as "contacting operation") is completed before the leading end of the image forming area reaches the developing position.

3-3. First Control

Next, the first control of the separation operation in the present embodiment is further explained. FIG. 7 is a timing chart showing the outline of the operation timing of each portion in the image forming process when first control is executed as the control of the separation operation. FIG. 7 shows the timing chart in the case of printing on a single sheet of recording material P. Image formation ON, image formation OFF regarding exposure, and image formation ON and image formation OFF regarding primary and secondary transfers in FIG. 7 are the same periods as in the comparative example shown in FIG. 6, respectively.

In the present embodiment, in the first control, just before the leading end of the image forming area reaches the developing position in each image forming portion SY, SM, SC, SK, as in the comparative example shown in FIG. 6, the contact operation with the photoreceptor drum 1 is completed. In other words, in each image forming portion SY, SM, SC, SK, the developing roller 41 contacts the photosensitive drum 1 in the order of Y, M, C, K from the image forming portion S upstream in the moving direction of the surface of the intermediary transfer belt 30 to the image forming portions S downstream, at a timing that allows image formation (development) from the leading end of the image forming area corresponding to one sheet of recording material P.

In the present embodiment, the separation of the developing roller 41 from the photosensitive drum 1 is started in each image forming portion SY, SM, SC, SK after the trailing end of the image forming area has passed through the primary transfer portion N1 of all (downstream) image forming portions S, and especially after passing through the secondary transfer portion N2 so that it does not overlap with the secondary transfer in the present embodiment.

In the first control, the contacting operation of the developing rollers 41 against the photosensitive drum 1 may be completed before the exposure (writing of electrostatic latent image) begins in all (upstream) image forming portions S. This can suppress the effect on the image caused by the contacting movement of the developing roller 41 to the photosensitive drum 1.

If the driving source of the intermediary transfer belt 30 is provided independently, the following may be used. The separation operation may be started in each image forming portion SY, SM, SC, SK after the trailing end of the image forming area has passed through the primary transfer portion N1 of all (downstream) image forming portions S (before the trailing end of the image forming area reaches the secondary transfer portion N2). Even if the intermediary transfer belt 30 is common as in the present embodiment, if it does not overlap with the secondary transfer, the separation operation can be started in each image forming portion S after the trailing end of the image forming area passes through the primary transfer portion N1 of all the image forming portions S.

3-4. Second Control

Next, the second control of the separation operation in the present embodiment is further explained. As mentioned above, in the present embodiment, the image analysis portion 303 of the image processing portion 303 analyzes image attributes to determine the vector image. Also, in the present embodiment, the conversion and other processing portion 402 of the image processing portion 303 determines the image trailing end of the Y, M, C, and K colors. Information indicating the results of the determination of the vector image by the image analysis portion 401 and the results of the determination of the trailing end of each color image by the conversion and other processing portion 402 are sent from the image processing portion 303 to the image forming controller 340 via the CPU 311, and are reflected in the control of the separation operation.

In the present embodiment, when the image attributes of the image formed immediately before the separation operation are all vector images, second control is performed to control the separation operation. In the second control, in each image forming portion S, the trailing end of the image in the image forming area is detected, and the separation operation is started after the trailing end of the image passes the developing position and before the trailing end of the image forming area reaches the primary transfer portion N1. Thus, in the second control, the developing roller 41 can be separated from the photosensitive drum 1 even while the image forming area is passing through the primary transfer portion N1 (timing in the middle of the paper). This reduces the time that the developing roller 41 is in contact with the photosensitive drum 1 while suppressing image blurring caused by load fluctuations on the photosensitive drum 1 when the developing roller 41 is moved away from the photosensitive drum 1.

FIG. 8 is a schematic drawing showing an example of an output image. The upper side in FIG. 8 is the leading end side of the recording material P in the feeding direction, and the lower side in FIG. 8 is the trailing end side of the recording material P in the feeding direction. Here, A4 paper is used as the recording material P, and the size of the recording material P and the size of the image forming area corresponding to the recording material P are assumed to be the substantially same. For example, as shown in FIG. 8, assume that the following is to be printed.

"A Happy New Year" in red letters on the leading end side of the paper in the feeding direction, "I was taken care of last year" in blue letters in the center of the paper in the feeding direction, "In this year thanking you in advance" in black letters on the trailing end side of the paper in the feeding direction.

In this case, the red text "A Happy New Year" is image data (vector image data) formed based on Y and M colors, the blue text "I was taken care of last year" is image data (vector image data) formed based on M and C colors, the black text "In this year thanking you in advance" is formed based on the K-color image data (vector image data).

In this case, in the image forming portion SY for Y, the developing roller 41Y can be separated from the photosensitive drum 1Y after visualizing "A Happy New Year" on the photosensitive drum 1Y, for example. In the image forming portion SM for M, the developing roller 41M can be separated from the photosensitive drum 1M after visualizing "I was taken care of last year" on the photosensitive drum 1M, for example, after primary transfer of "I was taken care of last year" on photosensitive drum 1M. Similarly, in the image forming portion SC for C, the developing roller 41C can be separated from the photosensitive drum 1C after visualizing "I was taken care of last year" on the photosensitive drum 1C, for example, after primary transfer of "I was taken care of last year" on photosensitive drum 1C. In the image forming portion SK for K, the developing roller 41K can be separated from the photosensitive drum 1K after visualizing "In this year thanking you in advance" on the photosensitive drum 1K, for example after the primary transfer of "In this year thanking you in advance" on photosensitive drum 1K.

FIG. 9 is a timing chart showing the outline of the operation timing of each portion in the image forming process when the second control is executed as the control of the separation operation. FIG. 9 shows an example of printing the image of FIG. 8 on a single sheet of recording material P. With respect to the exposure in FIG. 9, the image formation ON indicates the period from the time the leading end of the image forming area on the photosensitive drum 1 reaches the exposure position until the image trailing end passes the exposure position in each image forming portion SY, SM, SC, SK. The image formation OFF is the period of time other than that period. In addition, for primary transfer in FIG. 9, image formation ON indicates the period when the image forming area on the intermediary transfer belt 30 passes through the primary transfer position in each image forming portion SY, SM, SC, SK, and SK. Image formation OFF indicates a period of time other than that period. Regarding the secondary transfer in FIG. 9, image formation ON indicates the period when the image forming area on the intermediary transfer belt 30 passes through the secondary transfer position (approximately corresponding to the period when the recording material P passes through the secondary transfer portion N2), and image formation OFF indicates the period other than that period. In the secondary transfer in FIG. 9, the text (1) is "A Happy New Year," the text (2) is "I was taken care of last year," and the text (3) is "In this year thanking you in advance."

In the present embodiment, in the second control, the contacting movement of the developing roller 41 to the photosensitive drum 1 is completed just before the leading end of the image forming area reaches the developing position in each image forming portion SY, SM, SC, SK, as in the first control shown in FIG. 7. In other words, in each image forming portion SY, SM, SC, SK, the developing roller 41 contacts the photosensitive drum 1 in the order of Y, M, C, K from the image forming portion S upstream in the moving direction of the surface of the transfer belt 30 to the image forming portions S downstream, at the timing that allows image formation (development) from the leading end of the image forming area corresponding to one piece of recording material P.

In the image forming portion SY for Y, the separation operation of the developing roller 41 from the photosensitive drum 1Y is started immediately after the trailing end of the Y toner image of the text (1) on the photosensitive drum 1Y passes through the primary transfer portion N1Y (before the trailing end of the image forming area reaches the primary transfer portion N1Y). In the image forming portion SM for M, the separation operation of the developing roller 41M from the photosensitive drum 1M is started immediately after the trailing end of the toner image of color M in the text (2) on the photosensitive drum 1M passes the primary transfer portion N1M (before the trailing end of the image forming area reaches the primary transfer portion N1M). Similarly, in the image forming portion SC for C, the separation operation of the developing roller 41C from the photosensitive drum 1C is started immediately after the trailing end of the toner image of color C in the text (2) on the photosensitive drum 1C passes the primary transfer portion N1C (before the trailing end of the image forming area reaches the primary transfer portion N1C). In the image forming portion SK for K, the separation operation of the developing roller 41K from the photosensitive drum 1K is started immediately after the trailing end of the K toner image of the text (3) on the photosensitive drum 1K passes the primary transfer portion N1K (before the trailing end of the image forming area reaches the primary transfer portion N1K). Thus, in the present embodiment, in the second control, the timing for separating the developing roller 41 from the photosensitive drum 1 in each image forming portion S is just after the completion of image formation (primary transfer) onto the intermediary transfer belt 30.

In the present embodiment, the timing at which the contacting movement of the developing roller 41 to the photosensitive drum 1 is completed is before the leading end of the image forming area reaches the developing position. However, the present invention is not limited to such an arrangement but may be used as follows if image forming is not affected by the configuration and drive configuration of the image forming apparatus 100. In the second control, the leading end of the image is detected, and the contacting operation of the developing roller 41 to the photosensitive drum 1 is completed just before the leading end of the image reaches the developing position (after the leading end of the image forming area has passed the developing position). In other words, in the second control, the timing for bringing the developing roller 41 into contact with the photosensitive drum 1 may be the timing immediately before image formation (development) on the photosensitive drum 1 is started. This further reduces the time that the photosensitive drum 1 and the developing roller 41 are in contact with each other.

In the present embodiment, the timing to start the separation operation of the developing roller 41 from the photosensitive drum 1 is after the image trailing end passes the primary transfer portion N1. However, the present invention is not limited to such an arrangement. The separation operation of the developing roller 41 from the photosensitive drum 1 may be started immediately after the image trailing end passes the developing position (before the trailing end of the image forming area reaches the developing position). In other words, by starting the separation operation after the primary transfer in the image forming portion S where the developer roller 41 is separated, which is easily affected by the load fluctuation of the driving roller 70, the occurrence of image blurring can be easily suppressed. In addition, since the second control is executed for a vector image, which is less likely to cause blurring, the effect of image blurring on the image being developed or transferred in another image forming portion S (image forming portion S further downstream), or on the image being transferred in a secondary transfer, can be reduced. However, since the second control is executed in the case of a vector image, even if the separation operation is started immediately after the image trailing end passes the developing position, the effect of image blurring can be reduced for the image undergoing primary transfer in the image forming portion S, where the developing roller 41 is separated.

For the image forming portion S, where there is no image information to be formed (blank paper), it is not necessary to bring the developing roller 41 into contact with the photosensitive drum 1. However, for mechanical or other reasons, the developing roller 41 may once contact the photosensitive drum 1 even for the image forming portion S for which there is no image information to be formed. In this case, in the second control, in the image forming portion S, the developing roller 41 can be separated from the photosensitive drum 1 at an arbitrary timing (it is desirable that the timing be as early as possible) before the trailing end of the image area reaches the primary transfer portion N1.

When the separation operation is started after the image trailing end has passed through the primary transfer portion N1, the decision to control the separation operation can be made based on the image information of the image formed in the image forming portion S at least downstream from the image forming portion S in which the separation operation is performed. At this time, for example, if the image attribute of the image formed in the downstream image forming portion S above is a vector image, the second control can be executed as the control of the separation operation. This can suppress image blurring and other defects in the image forming portion S downstream of the above. On the other hand, if the separation operation is started immediately after the image trailing end has passed the developing position, the separation operation control decision should be based on the image information of the image formed in the image forming portion S where the separation operation is performed. In this case, for example, if the image attribute of the image formed at least in the image forming portion S is a vector image, and preferably the image attribute of the image formed in the image forming portion S downstream of the above is also a vector image the second control is performed as a control of the separation operation. This can suppress image blurring and other defects in the image forming portion S in addition to the image forming portion S downstream of the above. In the present embodiment, the case in which the image attribute of the image formed by all image forming portions S is a vector image is used as an example.

3-5. Operation Procedures

Next, referring to the flowchart in FIG. 10, the procedure for determining the control of the separation operation in the present embodiment is further explained. Here, the second control procedure of the separation operation is explained in particular, and the first control procedure of the separation operation is omitted as appropriate.

When the CPU 311 starts a print job, it first determines the number of copies to print based on the print job information (S101). In the present embodiment, the second control can be executed as a control of the separation operation in the case of a single print, considering the effect on the image formed on the preceding paper when there is a preceding paper in the secondary transfer portion N2. Therefore, in S101, the CPU 311 determines whether it is a single print or not. If the CPU 311 determines in S101 that it is a single print ("Yes"), it proceeds to S102. On the other hand, if the CPU 311 determines that it is not a single print ("No") in S101, it proceeds to S109 and decides to execute the first control as the control of the separation operation. The preceding paper refers to the recording material P that passes through the secondary transfer portion N2 before the recording material P to which the image currently being transferred (developed, primary transfer, etc.) in each image forming portion S. Single print means that an image is formed on a single recording material P in a print job initiated by a single start instruction.

If "Yes" in S101, the CPU 311 then acquires the result of the analysis of image attributes by image analysis portion 401 and determines whether the image data is a vector image data (all of the image data is vector image data) or not (S102). If the CPU 311 determines that the image is a vector image ("Yes") in S102, it decides to execute the second control as the control of the separation operation (S103). On the other hand, if the CPU 311 determines in S102 that it is not a vector image (contains image data that is not vector image data) ("No"), it proceeds to S109 to control the separation operation by the first control.

After S103, image conversion (RIP processing) (S104) is followed by color conversion (S105) in the conversion and other processing portion 402. Then, in the conversion and other processing portion 402, the image trailing ends of the Y, M, C, and K color images are detected based on the toner respective color data YMCK, and the CPU 311 obtains the detection results of the image trailing ends (S106). Next, in the conversion and other processing portion 402, y correction is performed using the LUT corresponding to the image data, and finally, halftoning is performed (S107). Then, the CPU 311, via the image forming controller 340, immediately after the image trailing end of each color passes through each primary transfer portionN1 (immediately after the end of primary transfer), the separation operation at the timing of image formation is executed (S108).

Thus, in the present embodiment, the image forming apparatus 100 comprises a rotatable first image bearing member 1Y, and a first developing member 41Y that contacts the first image bearing member 1Y in the developing position G and develops the electrostatic latent image on the first image bearing member 1Y with the first developer. The image forming apparatus 100 also comprises, for example, a second image bearing member 1M that can be rotated and on which an electrostatic latent image is formed in accordance with the image information, a second image bearing member 1M, and a second image forming portion SM with a second developing member 41M that contacts the second image bearing member 1M and develops the electrostatic latent image on the second image bearing member with a second developer. The image forming apparatus 100 also has a common driving source 70 that drives the first image bearing member 1Y, the first developing member 41Y, the second image bearing member 1M, and the second developing member 41M. The common driving source 70 drives the first image bearing member 1Y, the first developing member 41Y, the second image bearing member 1M, and the second developing member 41M, and the first transfer position N1Y transfers the image formed by the first developer from the first image bearing member 1Y to the transferred member (intermediary transfer member) 30. The image formed by the first developer is transferred to the second image bearing member 1M at the second transfer position N1M downstream from the first transfer position N1Y in the moving direction of the transferred member 30. A transfer device (intermediate transfer unit) 35 that transfers the image formed by the second developer from the second image bearing member 1M to the transferred member 30 at the second transfer position N1M downstream of the first transfer position N1Y in the moving direction of the transferred member 30, a contact-and-separation mechanism 60 that separates the first image bearing member 1Y and the first developing member 41M, and a contact-and-separation mechanism 60 that separates the first image bearing member 1Y from the second developing member 41M, and a controller (printer control unit) 304 that controls the contact-and-separation mechanism 60 are provided. Then, in the present embodiment, the controller 304 controls, when completing the operation of sequentially transferring the images from the first image bearing member 1Y and the second image bearing member 1M to the transferred member 30 when separating the first developing member 41Y from the first image bearing member 1Y, based on the above image information, the first image bearing member 1Y in the moving direction of the surface of the first image bearing member 1Y, based on the above-mentioned image information, the first control and after the trailing end of the image in the image forming area on the first image bearing member in the moving direction of the surface of the first image bearing member 1Y passes through the developing position G the second control to initiate the operation of separating the first developing member 41Y from the first image bearing member 1Y after the trailing end of the image in the image forming area on the first image bearing member in the direction of movement of the surface of the first image bearing member 1Y has passed the developing position G and before the trailing end of the image forming area has reached the first transfer position N1Y. The control is performed by switching between "second control" and "first control." In the present embodiment, the controller 304 controls the second control to be performed when the attribute of the input image information as image information before being converted to a raster image that defines an electrostatic latent image is a vector image. In the present embodiment, controller 304 controls to perform the first control if the attribute is a raster image.

Here, the controller 304 can control, in the second control, to start the operation of separating the first developing member 41Y from the first image bearing member 1Y after the trailing end of the above image has passed the first transfer position N1Y and before the trailing end of the above image forming area has reached the first transfer positionN1Y. In this case, the controller 304 can switch between first control and second control based on the image information of the image formed on the second image bearing member 1M as image information. The controller 304 can also control, in the second control, to start the operation of separating the first developing member 41Y from the first image bearing member 1Y after the trailing end of the above image has passed the developing position G and before the trailing end of the above image forming area has reached the developing position G. In this case, the controller 304 can switch between first control and second control based on the image information of the image formed on the first image bearing member 1Y as image information. The controller 304 can also control, in the first control, to start the operation to separate the first developing member 41Y from the first image bearing member 1Y after the trailing end of the image forming area on the transferring member in the moving direction of the transferring member 30 passes the second transfer position N1M.

In the present embodiment, the image forming apparatus 100 is configured to be able to perform the second control of the separation operation when it is a single print. In other words, the image forming apparatus 100 of the present embodiment, focusing on a certain image forming portion S and a secondary transfer portion N2, is composed as follows. The image forming apparatus 100 has a rotatable image bearing member 1 on which an electrostatic latent image is formed according to image information. It also has an image forming portion S equipped with a developing member 41 that contacts the image bearing member 1 in the developing position G and develops the electrostatic latent image on the image bearing member with the developer. It also has an intermediary transfer member 30 to which the image formed by the developer is transferred from the image bearing member 1 at the primary transfer position N1. It also has a transfer device (secondary transfer roller) 7 that transfers the image formed by the developer from the intermediary transfer member 30 to the recording material P at the secondary transfer position N2. It also has a common driving source 70 that drives the image bearing member 1, developing member 41, and intermediary transfer member 30. It also has a contact-and-separation mechanism 60 that contacts and separates the image bearing member 1 and developing member 41. It also has a controller (printer controller) 304 that controls the contact-and-separation mechanism 60. The controller 304 then moves the developing member 41 away from the image bearing member 1 when the operation of transferring the image from the image bearing member 1 to the image forming area on the intermediary transfer member is completed. When separating the developing member 41 from the image bearing member 1 at the end of the transfer operation, based on the presence or absence of the recording material P at the secondary transfer position N2 at the end of the development operation, the controller 304 can determine the image bearing first control to start the operation to separate the developing member 41 from the image bearing member 1 after the trailing end of the image forming area on the image bearing member passes the primary transfer position N1 in the direction of movement of the surface of the image bearing member 1, and after the trailing end of the image in the image forming area on the image bearing member in the moving direction of the surface of the image bearing member 1 has passed the developing position G and after the trailing end of the image in the image forming. The second control switches between the first control, which starts the operation to move the developing member 41 away from the image bearing member 1 after the trailing end of the image in the image forming area on the image bearing member on the surface of the image bearing member 1 in the direction of the movement of the surface of the image bearing member 1 passes the developing position G and before the trailing end of the image forming area reaches the primary transfer position N1. At this time, controller 304 controls to execute the second control if there is no recording material P in the secondary transfer position N2 when the above development is completed.

As explained above, the present embodiment performs the second control as the control of the separation operation when the image is a vector image based on the information of image attributes as image information of the image to be formed in a single print. In the second control, the image trailing end in the image forming area is detected in each image forming portion S, and the separation operation is started after the image trailing end has passed the developing position and before the trailing end of the image forming area reaches the primary transfer portion N1. Thus, in the second control, it is possible to separate the developing roller 41 from the photosensitive drum 1 even while the image forming area is passing through the primary transfer portion N1. This reduces the time that the photosensitive drum 1 and the developing roller 41 are in contact with each other while suppressing the occurrence of image blurring and other defects caused by load fluctuations of the driving motor 70 when the developing roller 41 is separated from the photosensitive drum 1.

In the present embodiment, the second control is executed as the control of the separation operation when the image is a vector image based on the information of image attributes as image information of the image to be formed in a single print, but the present embodiment is not limited to this. For example, even if the image attribute is a raster image instead of a vector image, if the area ratio of the raster image in the image forming area corresponding to one recording material P is sufficiently small, the second control may be performed as a control of the separation operation. If the area ratio of the raster image in the image forming area is sufficiently small, the effect on the image due to load fluctuations of the driving motor 70 is small. In other words, in this case, even if the image attribute is a raster image, the image blurring is hardly noticeable, so that even if image blurring occurs due to load fluctuations of the driving motor 70, it is difficult to see. The image to be formed may contain a mixture of images whose image attribute is vector images and raster images. The upper limit (threshold) of the area ratio of the raster image in the image forming area that can suppress defects such as image blurring can be set appropriately in advance through experiments. Thus, controller 304 can control the second control based on the attribute of the image data indicated by the input image information before being converted to a raster image that defines an electrostatic latent image as the image information, if the area ratio in the image forming area of the image whose attribute is a raster image is smaller than a predetermined value. The controller 304 can perform the first control when the area ratio in the image forming area of the image whose attribute is a raster image is greater than the predetermined value.

The control of the separation operation can also be switched based on the image density as image information of the image to be formed. In other words, even if the image attribute is a raster image, depending on its density, image blurring may not be noticeable, so even if image blurring occurs due to load fluctuations of the driving motor 70, it may be difficult to see. For example, even if the image attribute is a raster image, the second control may be performed to control the separation operation under the following conditions. For example, if the input image information includes image data in a region where the sensitivity of the density (chromaticity ΔE) to changes in image data in the engine gradation characteristics (before Dhalf control) is low, even if image blurring occurs, it is not noticeable because the variation in density (chromaticity ΔF) is small. Therefore, when the input image information includes such image data, even if image blurring occurs by executing the second control as the control of the separation operation, it is unlikely to be detected as uneven density. FIG. 13 is a graph showing the relationship between image data (density levels 00 h to FFh) and density (chromaticity ΔE) of the input image information. The dashed plot in FIG. 13 shows an example of the engine gradation characteristics after Dmax control and before Dhalf control (unique gradation characteristics of the image forming apparatus 100), and the solid line plot in FIG. 13 shows an example of the target gradation characteristics of the Dhalf control. The Dmax control is one of the image density controls in the image forming apparatus 100, which aims to keep the maximum density of each color constant. Specifically, in Dmax control, multiple density patches (test images) formed under different image forming conditions are detected by an optical sensor, the image forming conditions that obtain the desired maximum density are determined from the results, and the image forming conditions are changed (adjusted). Dhalf control is one of the image density controls in the image forming apparatus 100, and its purpose is to keep the halftone gradation characteristics linear with respect to the image signal. In the Dhalf control, image processing is performed to cancel the y characteristics and keep the input-output characteristics linear in order to suppress the shift of the output image density from the input image signal due to the nonlinear input characteristics (y characteristics) inherent to the image forming apparatus 100. Specifically, in Dhalf control, multiple density patches (test images) with different input image signals are detected by an optical sensor to obtain the relationship between the input image signal and the output image density. Then, a tone correction table is generated to convert the input image signal to obtain the desired output image density for the input image signal. Dhalf control is performed after the image forming conditions (charging voltage, developing voltage, exposure amount, etc.) are determined by the Dmax control. The chromaticity (color difference) ΔE, for example, is expressed as $\Delta E=\{(\Delta L^*)2+(\Delta a^*)2+(\Delta b^*)2\}½$ in the L*a*b* equal color space.

Referring to FIG. 13, areas that are less likely to be detected as uneven density are those where the rise of ΔE in the change of image data (density level) is relatively small, such as DOh to FFh on the high density side and 00 h to 30 h on the low density side. For example, even if the image to be formed contains an image whose image attribute is a raster image, second control can be performed if the density of the raster image meets the following predetermined conditions. That is, the predetermined condition is, for example, when the density of the raster image is within the range shown in the above example, or when the area ratio in the image forming area of the raster image whose density is outside the range shown in the above example is sufficiently small. As exemplified above, the predetermined range of image density includes, for example, at least one (typically both) of the following: a first range, which is a predetermined range from the lowest density to the higher density side, and a second range, which is a predetermined range from the highest density to the lower density side. The image to be formed may contain a mixture of images whose image attribute is vector images and raster images. The upper limit (threshold) of the area ratio of the raster image whose density is outside the predetermined range, which can suppress defects such as image blurring, can be set appropriately through experiments or other means in advance. The aforementioned control by area ratio of the raster image itself and the above control by density may be combined. For example, if the area ratio of the raster image is smaller than a predetermined value, second control is performed regardless of the density of the raster image, and even if the area ratio of the raster image is larger than the predetermined value, if the density meets the above predetermined conditions, the second control can be performed regardless of the concentration of the raster image. Thus, if the image density is within a predetermined range, or if the area ratio in the image forming area of an image whose image density is outside the predetermined range is less than a predetermined value, the controller 304 can control to perform the second control based on the image density indicated by the input image information before being converted to a raster image that defines an electrostatic latent image as the image information. If there is an image whose image density is outside the predetermined range, or if the area ratio in the image forming area of an image whose image density is outside the predetermined range is greater than the predetermined value, the controller 304 can control to execute the first control.

Next, other embodiments of the present invention will be explained. The basic configuration and operation of the image forming apparatus of the present embodiment are the same as those of the image forming apparatus of the first embodiment. Therefore, in the image forming apparatus of the present embodiment, elements having the same or corresponding functions or configuration as those of the image forming apparatus of the first embodiment are marked with the same codes as those of the image forming apparatus of the first embodiment, and detailed explanation is omitted.

In the first embodiment, the present invention was applied with respect to image formation in a single print, while in the present embodiment, the present invention is applied with respect to the last image formation in a continuous print.

In the present embodiment, in addition to a photosensitive drum 1 and developing roller 41 of each image forming portion SY, SM, SC, and SK, the driving motor 70 that drives the intermediary transfer belt 30 (driving roller 31) is also common. In this configuration, the timing for separating the developing roller 41 from the photosensitive drum 1 may be after the preceding paper is discharged. This is to avoid load fluctuations in the driving motor 70 by separating the developing roller 41 from the photosensitive drum 1, which may cause image blurring or other defects to the image formed on the preceding paper.

FIG. 11 is a schematic cross-sectional drawing showing the positioning of the image in successive prints in the present embodiment, and the image forming apparatus 100. In FIG. 11, the dashed (large) line 92 on the intermediary transfer belt 30 is the final page image in a continuous print (hereinafter also referred to as the "final image"). In FIG. 11, the dashed line (small) 91 on the intermediary transfer belt 30 is the image one before the last one in continuous printing (hereinafter also referred to as "pre-final image").

Similar to the first embodiment, based on the image information of the final image 92, the separation operation can be started after the trailing end of the final image 92 has passed the developing position and before the trailing end of the image forming area reaches the primary transfer portion N1 in each image forming portion S. However, in continuous printing, image blurring may occur in the pre-final image 91 in the secondary transfer portion N2 due to load fluctuations in the driving motor 70 caused by the separation of the developing roller 41 from the photosensitive drum 1. Therefore, the present embodiment determines whether it is possible to perform the second control as a control of the separation operation, based also on the image information of the pre-final image 91 in the continuous print.

The preceding image that may overlap with the formation of the final image and secondary transfer in continuous printing is often configured as the pre-final image, which is one image before the final image, but it may be any other preceding image, for example, two images before the final image.

Next, the flowchart drawing in FIG. 12 further explains the procedure for determining the control of the separation operation in the present embodiment. Here, the second control procedure of the separation operation is described in particular, and the first control procedure of the separation operation is omitted as appropriate.

In the case of continuous printing, the CPU 311 determines whether the image to be formed is the final image or not based on the print job information during the print job execution (S201). If the CPU 311 judges that the image is the final image ("Yes") in S201, it proceeds to the process of S202. On the other hand, if the CPU 311 determines in S201 that it is not the final image ("No"), it returns to the process of S201.

If "Yes" in S201, the CPU 311 obtains the results of the analysis of the image attributes of the pre-final image by the image analysis portion 401 next. Then, it determines whether the image data of the pre-final image is a vector image data (all of the image data are vector image data) or not (S202). If CPU 311 determines that the pre-final image is a vector image ("Yes") in S202, it proceeds to S203. On the other hand, if the CPU 311 determines in S202 that the pre-final image is not a vector image (contains image data that is not vector image data) ("No"), it proceeds to S210, and decides to execute first control as the control of the separation operation regarding the final image.

If "Yes" in S202, then the CPU 311 obtains the results of the analysis of the image attributes of the final image by image analysis portion 401, and determines whether the image data of the final image is vector image data (all of the image data are vector image data) or not (S203). If the image forming portion 340 determines that the final image is a vector image ("Yes") in S203, it decides to execute the second control as the control of the separation operation for the final image (S204). On the other hand, if CPU 311 determines in S203 that the final image is not a vector image (contains image data that is not vector image data) ("No"), it proceeds to S210, and decides to execute the first control as the control of the separation operation regarding the final image.

After S204, image conversion (RIP processing) (S205) is followed by color conversion (S206) in the conversion and other processing portion 402. Then, in the conversion and other processing portion 402, the image trailing ends of the Y, M, C, and K color images are detected based on the toner respective color data YMCK, and the CPU 311 obtains the detection results of the image trailing ends (S207). Next, in the conversion and other processing portion 402, y correction is performed using the LUT corresponding to the image data, and finally, halftoning is performed (S208). Then, the CPU 311, executes image formation via the image forming controller 340, starting the separation operation at the timing immediately after the image trailing end of each color passes through each primary transfer portion N1 (immediately after the end of the primary transfer) (S209).

Thus, in the present embodiment, the image forming apparatus 100 is configured to switch control of the separation operation based on the image information of the preceding image. In other words, the image forming apparatus 100 of the present embodiment, focusing on a certain image forming portion S and a secondary transfer portion N2, is composed as follows. When the controller (printer controller) 304 separates the developing member 41 from the image bearing member 1 when completing the operation of sequentially transferring images to the plurality of image forming areas on the intermediary transfer member in the moving direction of the surface of the intermediary transfer member 30 is completed, the developing member 41 is separated from the image bearing member 1 when the development of the image transferred to the last image forming area among the above plurality of image forming areas is completed. When the image to be transferred in the last image forming area of the above plurality of image forming areas has finished developing, the image information of the image to be transferred in the image forming area preceding the above last image forming area that passes through the secondary transfer position N2 when the image to be transferred in the last image forming area of the above plurality of image forming areas has finished developing is used as a basis for the movement of the surface of image bearing member 1. The first control to start the operation of separating the developing member 41 from the image bearing member 1 after the trailing end of the image forming area on the image bearing member in the direction of movement of the surface of the image bearing member 1 has passed the primary transfer position N1, and first control to start the operation of separating the developing member 41 from the image bearing member 1 after the trailing end of the image forming area on the image bearing member in the moving direction of the surface of the image bearing member 1 has passed the developing position G, and before the trailing end of the image forming area reaches the primary transfer position N1, the second control is to start the operation of separating the developing member 41 from the image bearing member 1. The controller 304 can control the execution of the second control based on the attribute of the image data indicated by the input image information before it is converted to a raster image that defines an electrostatic latent image as image information, if the attribute is a vector image. In this case, the controller 304 can control in the second control to start the operation to separate the developing member 41 from the image bearing member 1 after the trailing end of the above image has passed the primary transfer position N1 and before the trailing end of the above image forming area has reached the primary transfer position N1.

The controller 304 can control to switch between the first control and second control based on the first image information, which is the image information of the image to be transferred to the last image forming area above, and the second image information, which is the image information of the image to be transferred to the preceding image forming area above. In this case, the controller 304 can control to execute the second control based on the attributes of the input image data indicated by the first image information and the second image information before being converted to a raster image that defines an electrostatic latent image as the first image information and the second image information, if the attributes are vector images, respectively. In this case, the controller 304 can control to start the operation to separate the developing member 41 from the image bearing member 1 after the trailing end of the above image has passed the developing position G and before the trailing end of the above image forming area has reached the developing position G. In the first control, the controller 304 can also control to start the operation to separate the developing member 41 from the image bearing member 1 after the trailing end of the last image forming area above in the moving direction of the surface of the intermediary transfer member 30 has passed the secondary transfer position N2.

For images in the last image forming area or the preceding image forming area, the separation operation can be switched based on whether or not the area ratio or image density of the raster image meets the specified conditions, as well as whether or not the image attribute is a vector image, as described in the first embodiment. When control is based on the first image information and the second image information, control can be performed so that the second control is executed when both the last image forming area and the image to be formed in the preceding image forming area satisfy the above predetermined conditions. If either the last image forming area or the image formed in the preceding image forming area does not meet the above predetermined conditions, control can be performed to execute the first control.

As explained above, in the present embodiment, based on the information of image attributes as image information of the pre-final image and the final image in continuous printing, when both of these images are vector images, the second control regarding the final image is executed. This helps to suppress image blurring and other defects in the pre-final image. In the second control, the image trailing end in the image forming area is detected in each image forming portion S, and the separation operation is started after the image trailing end has passed the developing position and before the trailing end of the image forming area reaches the primary transfer portion N1. Thus, in the second control, it is possible to separate the developing roller 41 from the photosensitive drum 1 even while the image forming area is passing through the primary transfer portion N1. This reduces the time that the photosensitive drum 1 and the developing roller 41 are in contact with each other while suppressing the occurrence of image blurring and other defects caused by load fluctuations of the driving motor 70 when the developing roller 41 is separated from the photosensitive drum 1.

Although the present invention has been described above in terms of specific embodiments, the present invention is not limited to the above embodiments.

In the above embodiments, an example of connecting a host computer to an image forming apparatus for printing was used, but the present invention is not limited to such an arrangement. For example, instead of a host computer, a computer connected over a network or a print server may be connected to the image forming apparatus for printing.

In the above embodiments, image analysis was performed by the image processing portion on the controller, but part or all of the image analysis may be performed by a program on a host computer, printer on a network, or print server.

In the above embodiments, the intermediary transfer method is used as an inline method image forming apparatus, but the present invention is not limited to such an arrangement. The inline method image forming apparatus may consist of a direct transfer method using a recording material bearing member that carries and rotates the recording material. The direct transfer method image forming apparatus has a recording material bearing belt composed of, for example, an endless belt as a recording material bearing member instead of an intermediary transfer member in the intermediary transfer method image forming apparatus. The image formed on the image bearing member of each image forming portion is then directly transferred onto the recording material fed by the recording material bearing member. The direct transfer method image forming apparatus differs from the above embodiment in that direct transfer of the image to the recording material on the recording material bearing member as a transferred member is performed instead of the primary transfer in the above embodiment. However, the timing of other operations, such as the timing of the contact between the developing member and the image bearing member, can be substantially the same as in the embodiments above.

According to the present invention, the time that the image bearing member is in contact with the developing member can be reduced while suppressing the occurrence of image blurring and other defects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-114657 filed on Jul. 9, 2021, which is hereby incorporated by reference herein in its entirety.

What is claimed is:

1. An image forming apparatus comprising:

a first image forming portion provided with a first rotatable image bearing member on which an electrostatic latent image corresponding to image information is formed, and a first developing member contacting the first image bearing member at a developing position and configured to develop the electrostatic latent image on the first image bearing member with a first developer;

a second image forming portion provided with a second rotatable image bearing member on which an electrostatic latent image corresponding to image information is formed, and a second developing member contacting the second image bearing member and configured to develop the electrostatic latent image on the second image bearing member with a second developer;

a common driving source configured to drive the first image bearing member, the first developing member, the second image bearing member, and the second developing member;

a transfer device configured to transfer an image formed with the first developer from the first image bearing member to a transferred member at a first transfer position, and transfer an image formed with the second developer from the second image bearing member to the transferred member at a second transfer position downstream of the first transfer position with respect to a moving direction of the transferred member;

a contact-and-separation mechanism configured to cause the first developing member to contact or separate from the first image bearing member; and a controller configured to control the contact-and-separation mechanism, wherein in a case that the first developing member is separated from the first image bearing member when an operation in which the image is sequentially transferred to the transferred member from the first image bearing member and the second image bearing member is terminated, the controller controls based on the image information to switch and execute a first control in which the first developing member is started to separate from the first image bearing member after an end portion of an image forming area on the first image bearing member with respect to a moving direction of a surface of the first image bearing member passes through the first transfer position, and a second control in which the first developing member is started to separate from the first image bearing member after the end portion of the image forming area on the first image bearing member with respect to the moving direction of the surface of the first image bearing member passes through the developing position and before the end portion of the image forming area reaches the first transfer position.

2. An image forming apparatus according to claim 1, wherein the controller controls to execute the second control in a case that an attribute of image data, which is indicated by input image information before being converted to a raster image defining the electrostatic latent image as the image information, is a vector image.

3. An image forming apparatus according to claim 1, wherein the controller controls to execute the second control in a case that an attribute of image data, which is indicated by input image information before being converted to a raster image defining the electrostatic latent image as the image information, is the raster image and an area ratio of the raster image in the image forming area is smaller less than a predetermined value.

4. An image forming apparatus according to claim 1, wherein the controller controls to execute the second control in a case that an image density, which is indicated by input image information before being converted to a raster image defining the electrostatic latent image as the image information, is within a predetermined range or in a case that an area ratio of the image, of which image density is out of the predetermined range, in the image forming area is less than a predetermined value.

5. An image forming apparatus according to claim 1, wherein, in the second control, the controller controls the first developing member to start to separate from the first image bearing member after the end portion of the image passes through the first transfer position and before the end portion of the image forming area reaches the first transfer position.

6. An image forming apparatus according to claim 5, wherein the controller controls to switch and execute the first control and the second control based on image information of the image formed on the second image bearing member as the image information.

7. An image forming apparatus according to claim 1, wherein, in the second control, the controller controls the first developing member to start to separate from the first image bearing member after the end portion of the image passes through the developing position and before the end portion of the image forming area reaches the developing position.

8. An image forming apparatus according to claim 7, wherein the controller controls to switch and execute the first control and the second control based on image information of the image formed on the first image bearing member as the image information.

9. An image forming apparatus according to claim 8, wherein, in the second control, the controller controls the developing member to start to separate from the image bearing member after the end portion of the image passes through the primary transfer position and before the end portion of the image forming area reaches the primary transfer position.

10. An image forming apparatus according to claim 1, wherein, in the first control, the controller controls the first developing member to start to separate from the first image bearing member after an end portion of an image forming area on the transferred member with respect to the moving direction of the transferred member passes through the second transfer position.

11. An image forming apparatus comprising:

a first image forming portion provided with a rotatable image bearing member on which an electrostatic latent image corresponding to image information is formed, and a developing member contacting the image bearing member at a developing position and configured to develop the electrostatic latent image on the image bearing member with a developer;

an intermediary transfer member onto which an image formed with the developer is transferred from the image bearing member at a primary transfer position;

a transfer device configured to transfer the image formed with the developer from the intermediary transfer member to a recording material at a secondary transfer position;

a common driving source configured to drive the image bearing member, the developing member, and the intermediary transfer member;

a contact-and-separation mechanism configured to cause the developing member to contact or separate from the image bearing member; and a controller configured to control the contact-and-separation mechanism, wherein in a case that the developing member is separated from the image bearing member when an operation in which the image is sequentially transferred to a plurality of image forming areas on the intermediary transfer member with respect to a moving direction of a surface of the intermediary transfer member from the image bearing member is terminated, the controller controls, based on the image information of the image transferred to an image forming area passing through the secondary transfer position and preceding to a last image forming area in the plurality of the image forming areas when development of the image to the last image forming area is terminated, to switch and execute a first control in which the developing member is started to separate from the image bearing member after an end portion of an image forming area on the image bearing member with respect to a moving direction of a surface of the image bearing member passes through the primary transfer position, and a second control in which the developing member is started to separate from the image bearing member after the end portion of the image in the image forming area on the image bearing member with respect to the moving direction of the surface of the image bearing member passes through the developing position and before the end portion of the image forming area reaches the primary transfer position.

12. An image forming apparatus according to claim 11, wherein the controller controls to execute the second control in a case that an attribute of image data, which is indicated by input image information before being converted to a raster image defining the electrostatic latent image as the image information, is a vector image.

13. An image forming apparatus according to claim 11, wherein the controller controls to execute the second control in a case that an attribute of image data, which is indicated by input image information before being converted to a raster image defining the electrostatic latent image as the image information, is the raster image and an area ratio of the raster image in the image forming area is smaller less than a predetermined value.

14. An image forming apparatus according to claim 11, wherein the controller controls to execute the second control in a case that an image density, which is indicated by input image information before being converted to a raster image defining the electrostatic latent image as the image information, is within a predetermined range or in a case that an area ratio of the image, of which image density is out of the predetermined range, in the image forming area is less than a predetermined value.

15. An image forming apparatus according to claim 11, wherein, in the second control, the controller controls the developing member to start to separate from the image bearing member after the end portion of the image passes through the primary transfer position and before the end portion of the image forming area reaches the primary transfer position.

16. An image forming apparatus according to claim 11, wherein the controller controls to switch and execute the first control and the second control based on first image information of the image transferred to the last image forming area as the image information and second image information of the image transferred to the preceding image forming area as the image information.

17. An image forming apparatus according to claim 16, wherein the controller controls to execute the second control in a case that an attribute of image data, which is indicated by input image information before being converted to a raster image defining the electrostatic latent image as the first image information and the second image information, is a vector image.

18. An image forming apparatus according to claim 16, wherein the controller controls to execute the second control in a case that an attribute of image data, which is indicated by input image information before being converted to a raster image defining the electrostatic latent image as the first image information and the second image information, is the raster image and each of area ratios of the raster image in the last image forming area and the preceding image forming area is less than a predetermined value.

19. An image forming apparatus according to claim 16, wherein the controller controls to execute the second control in a case that each of image densities, which are indicated by input image information before being converted to a raster image defining the electrostatic latent image as the first image information and the second image information, is within a predetermined range or in a case that each of area ratios of the raster image, of which image densities are out of the predetermined range, in the last image forming area and the preceding image forming area is less than a predetermined value.

20. An image forming apparatus according to claim 16, wherein, in the second control, the controller controls the developing member to start to separate from the image bearing member after the end portion of the image passes through the developing position and before the end portion of the image forming area reaches the developing position.

21. An image forming apparatus according to claim 11, wherein, in the first control, the controller controls the developing member to start to separate from the image bearing member after the end portion of the last image forming area passes through the secondary transfer position with respect to the moving direction of the surface of the intermediary transfer member.

22. An image forming apparatus comprising:

an image forming portion provided with a rotatable image bearing member on which an electrostatic latent image corresponding to image information is formed, and a developing member contacting the image bearing member at a developing position and configured to develop the electrostatic latent image on the image bearing member with a developer;

an intermediary transfer member onto which an image formed with the developer is transferred from the image bearing member at a primary transfer position;

a transfer device configured to transfer the image formed with the developer from the intermediary transfer member to a recording material at a secondary transfer position;

a common driving source configured to drive the image bearing member, the developing member, and the intermediary transfer member;

a contact-and-separation mechanism configured to cause the developing member to contact or separate from the image bearing member; and a controller configured to control the contact-and-separation mechanism, wherein in a case that the developing member is separated from the image bearing member when an operation in which the image is transferred to an image forming area on the intermediary transfer member from the image bearing member is terminated, the controller controls, based on presence or absence of the recording material at the secondary transfer position when development is terminated, to switch and execute a first control in which the developing member is started to separate from the image bearing member after an end portion of an image forming area on the image bearing member with respect to a moving direction of a surface of the image bearing member passes through the primary transfer position, and a second control in which the developing member is started to separate from the image bearing member after the end portion of the image in the image forming area on the image bearing member with respect to the moving direction of the surface of the image bearing member passes through the developing position and before the end portion of the image forming area reaches the primary transfer position.

23. An image forming apparatus according to claim 22, wherein the controller controls to execute the second control in a case that the recording material is absent at the secondary transfer position when development is terminated.

* * * * *